United States Patent
Fischer et al.

(10) Patent No.: US 8,208,402 B2
(45) Date of Patent: Jun. 26, 2012

(54) CHANGING A RADIO ACCESS CONFIGURATION BETWEEN A TERMINAL AND A NETWORK

(75) Inventors: Patrick Fischer, Paris (FR); Dragan Vujcic, Limours (FR)

(73) Assignee: LG Electronics Inc., Seoul (KR)

( * ) Notice: Subject to any disclaimer, the term of this patent is extended or adjusted under 35 U.S.C. 154(b) by 233 days.

(21) Appl. No.: 11/913,542

(22) PCT Filed: May 3, 2006

(86) PCT No.: PCT/KR2006/001672
§ 371 (c)(1),
(2), (4) Date: Nov. 2, 2007

(87) PCT Pub. No.: WO2006/118426
PCT Pub. Date: Nov. 9, 2006

(65) Prior Publication Data
US 2008/0198763 A1  Aug. 21, 2008

Related U.S. Application Data

(60) Provisional application No. 60/677,678, filed on May 3, 2005, provisional application No. 60/677,677, filed on May 3, 2005, provisional application No. 60/732,288, filed on Oct. 31, 2005, provisional application No. 60/765,788, filed on Feb. 6, 2006.

(51) Int. Cl.
*H04L 12/28* (2006.01)
(52) U.S. Cl. .................................................. 370/254
(58) Field of Classification Search ............. 370/254
See application file for complete search history.

(56) References Cited

U.S. PATENT DOCUMENTS

| | | | |
|---|---|---|---|
| 6,374,099 B1 | 4/2002 | Bi et al. | |
| 6,535,736 B1 * | 3/2003 | Balogh et al. | |
| 6,823,193 B1 * | 11/2004 | Persson et al. | 455/522 |
| 2002/0094834 A1 * | 7/2002 | Baker et al. | 455/522 |
| 2003/0031119 A1 * | 2/2003 | Kim et al. | 370/200 |
| 2003/0139170 A1 | 7/2003 | Heo | |
| 2003/0144021 A1 * | 7/2003 | Cao et al. | 455/522 |

(Continued)

FOREIGN PATENT DOCUMENTS

CN  1505910  6/2004

(Continued)

OTHER PUBLICATIONS

Hauwei; "Proposal on Activation Time in RB Setup message"; 3GPP TSG-RAN WG2 Meeting #49; R2-052777; Nov. 7, 2005.

(Continued)

*Primary Examiner* — Ayaz Sheikh
*Assistant Examiner* — Hai-Chang Hsiung
(74) *Attorney, Agent, or Firm* — Lee, Hong, Degerman, Kang & Waimey

(57) ABSTRACT

A method of changing a radio access configuration between a terminal and a network. The network performs the steps of: initiating a new configuration that is related to an old configuration for the same terminal; informing the terminal to apply the second configuration; and determining when the terminal uses the second configuration based on the reception of a radio signal from the terminal. The terminal performs the steps of: receiving information to apply a new configuration; transmitting, to the network, a radio signal indicating a change in configuration; and changing from an old configuration to the new configuration at a predetermined time after transmitting the radio signal.

16 Claims, 24 Drawing Sheets

U.S. PATENT DOCUMENTS

| | | | |
|---|---|---|---|
| 2003/0185159 A1* | 10/2003 | Seo et al. .................... | 370/278 |
| 2003/0223452 A1 | 12/2003 | Toskala et al. | |
| 2004/0077348 A1* | 4/2004 | Sebire et al. ................. | 455/436 |
| 2004/0218569 A1* | 11/2004 | Pedersen et al. ............. | 370/334 |
| 2004/0264497 A1 | 12/2004 | Wang et al. | |
| 2005/0043034 A1 | 2/2005 | Abdel-ghaffar et al. | |
| 2006/0062145 A1* | 3/2006 | Kirla ........................... | 370/230 |
| 2007/0111663 A1* | 5/2007 | Beyer et al. ................. | 455/63.1 |

FOREIGN PATENT DOCUMENTS

| | | |
|---|---|---|
| JP | 11-068820 | 3/1999 |
| JP | 2001-251666 | 9/2001 |
| JP | 2003-115796 | 4/2003 |
| JP | 2005-072682 | 3/2005 |
| JP | 2006-141033 | 6/2006 |
| KR | 10-0430562 | 5/2004 |
| KR | 10-0496156 | 6/2005 |
| TW | 486895 | 5/2002 |
| TW | 517488 | 1/2003 |
| TW | 576054 | 2/2004 |
| WO | 03/088695 | 10/2003 |
| WO | WO 03/088695 * | 10/2003 |

OTHER PUBLICATIONS

Alcatel; "HS-DSCH Serving Cell Change Procedure Corrections"; 3GPP TSG-RAN3 Meeting #41; Tdoc R3-040261; Feb. 16, 2004.

LG Electronics Inc.; "Reconfiguration with activation time 'now'"; 3GPP TSG-RAN WG3 Meeting #53; Tdoc R3-060549; May 8, 2006.

* cited by examiner

CHANGING A RADIO ACCESS CONFIGURATION BETWEEN A TERMINAL AND A NETWORK

This application is the National Stage filing under 35 U.S.C. 371 of International Application No. PCT/KR06/01672, filed on May 3, 2006, which claims the benefit of U.S. Provisional Application No. 60/677,678, filed on May 3, 2005, and U.S. Provisional Application No. 60/677,677, filed on May 3, 2005, and U.S. Provisional Application No. 60/732,288, filed on Oct. 31, 2005, and U.S. Provisional Application No. 60/765,788, filed on Feb. 6, 2006.

TECHNICAL FIELD

The present invention relates to wireless (radio) communications, and more particularly, relates to changing a radio access configuration between a terminal and a network that support telecommunications.

BACKGROUND ART

A universal mobile telecommunication system (UMTS) is a European-type, third generation IMT-2000 mobile communication system that has evolved from a European standard known as Global System for Mobile communications (GSM). UMTS is intended to provide an improved mobile communication service based upon a GSM core network and wideband code division multiple access (W-CDMA) wireless connection technology. In December 1998, a Third Generation Partnership Project (3GPP) was formed by the ETSI of Europe, the ARIB/TTC of Japan, the T1 of the United States, and the TTA of Korea. The 3GPP creates detailed specifications of UMTS technology. In order to achieve rapid and efficient technical development of the UMTS, five technical specification groups (TSG) have been created within the 3GPP for standardizing the UMTS by considering the independent nature of the network elements and their operations. Each TSG develops, approves, and manages the standard specification within a related region. Among these groups, the radio access network (RAN) group (TSG-RAN) develops the standards for the functions, requirements, and interface of the UMTS terrestrial radio access network (UTRAN), which is a new radio access network for supporting W-CDMA access technology in the UMTS.

In the description hereafter, the following abbreviations will be used:
AM Acknowledged mode
AS Access Stratum
ASN.1 Abstract Syntax Notation.1
CQI Channel Quality Indicator
MAC Medium Access Control
MBMS Multicast Broadcast Multimedia Service
NAS Non Access Stratum
RRC Radio Resource Control
S-CCPCH Secondary Common Control Physical Channel
SRB Signaling Radio Bearer
TCTF Target Channel Type Field
TFC Transport format combination
TM Transparent mode
TPC Transmit power commands
UE User Equipment
UM Unacknowledged mode FIG. 1 gives an overview of the UMTS network 100, including the UE 110, the UTRAN 120 and the core network (CN) 130. As shown in FIG. 1, a UMTS system 100 is generally composed of a UE 110, NodeB 122, RNC 124, 126, SGSN 131, MSC 132 and other nodes, with different interfaces therebetween, which will be explained in more detail.

The UTRAN 120 is composed of several RNCs 124, 126 and NodeBs 122, which are connected via the Iub interface. Each RNC controls several NodeBs. Each NodeB controls one or several cells, where a cell is characterized by the fact that it covers a given geographical area on a given frequency. Each RNC is connected via the Iu interface to the CN 130, i.e. towards the MSC 132 (Mobile-services Switching Centre) entity of the CN and the SGSN 131 (Serving GPRS Support Node) entity. RNCs can be connected to other RNCs via the Iur interface. The RNC handles the assignment and management of radio resources and operates as an access point with respect to the core network.

The NodeBs receive information sent by the physical layer of the terminal (UE 110) through an uplink and transmit data to the terminal through a downlink. The Node-Bs operate as access points of the UTRAN for the terminal. The SGSN 131 is connected via the Gf interface to the EIR 133 (Equipment Identity Register), via the GS interface to the MSC 132, via the GN interface to the GGSN 135 (Gateway GPRS Support Node) and via the GR interface to the HSS 134 (Home Subscriber Server). The EIR hosts lists of mobiles (terminals) which are allowed or are not allowed to be used on the network. The MSC which controls the connection for CS services is connected via the NB interface towards the MGW 136 (Media Gateway), via the F interface towards the EIR 133, and via the D interface towards the HSS 134. The MGW 136 is connected via the C interface towards the HSS 134, and to the PSTN (Public Switched Telephone Network), and allows to adapt the codecs between the PSTN and the connected RAN.

The GGSN is connected via the GC interface to the HSS, and via the GI interface to the Internet. The GGSN is responsible for routing, charging and separation of data flows into different RABs. The HSS handles the subscription data of the users.

Other connections exist that are not important for the current invention.

The UTRAN 120 constructs and maintains a radio access bearer (RAB) for communication between the terminal 110 and the core network 130. The core network requests end-to-end quality of service (QoS) requirements from the RAB, and the RAB supports the QoS requirements the core network has set. Accordingly, by constructing and maintaining the RAB, the UTRAN can satisfy the end-to-end QoS requirements.

The services provided to a specific terminal (UE 110) are roughly divided into the circuit switched (CS) services and the packet switched (PS) services. For example, a general voice conversation service is a circuit switched service, while a Web browsing service via an Internet connection is classified as a packet switched (PS) service.

For supporting circuit switched services, the RNCs 124, 126 are connected to the mobile switching center (MSC 132) of the core network 130 and the MSC 132 is connected to the gateway mobile switching center (GMSC) that manages the connection with other networks. For supporting packet switched services, the RNCs are connected to the serving general packet radio service (GPRS) support node (SGSN 131) and the gateway GPRS support node (GGSN 135) of the core network. The SGSN supports the packet communications with the RNCs and the GGSN manages the connection with other packet switched networks, such as the Internet.

FIG. 2 illustrates a structure of a radio interface protocol between the terminal and the UTRAN according to the 3GPP radio access network standards. As shown in FIG. 2, the radio interface protocol has horizontal layers comprising a physical layer, a data link layer, and a network layer, and has vertical planes comprising a user plane (U-plane) for transmitting user data and a control plane (C-plane) for transmitting control information. The user plane is a region that handles traffic information with the user, such as voice or Internet protocol (IP) packets. The control plane is a region that handles control information for an interface with a network, maintenance and management of a call, and the like.

The protocol layers in FIG. 2 can be divided into a first layer (L1), a second layer (L2), and a third layer (L3) based on the three lower layers of an open system inter-connection (OSI) standard model. The first layer (L1), namely, the physical layer, provides an information transfer service to an upper layer by using various radio transmission techniques. The physical layer is connected to an upper layer called a medium access control (MAC) layer, via a transport channel. The MAC layer and the physical layer exchange data via the transport channel. The second layer (L2) includes a MAC layer, a radio link control (RLC) layer, a broadcast/multicast control (BMC) layer, and a packet data convergence protocol (PDCP) layer. The MAC layer handles mapping between logical channels and transport channels and provides allocation of the MAC parameters for allocation and re-allocation of radio resources. The MAC layer is connected to an upper layer called the radio link control (RLC) layer, via a logical channel. Various logical channels are provided according to the type of information transmitted. In general, a control channel is used to transmit information of the control plane and a traffic channel is used to transmit information of the user plane. A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast control channel (BCCH), and a paging control channel (PCCH), or a Shared Control Channel (SCCH) and other channels. The BCCH provides information including information utilized by a terminal to access a system. The PCCH is used by the UTRAN to access a terminal.

For the purposes of MBMS additional traffic and control channels are introduced in the MBMS standard. The MCCH (MBMS point-to-multipoint Control Channel is used for transmission of MBMS control information, the MTCH (MBMS point-to-multipoint Traffic Channel) is used for transmitting MBMS service data. The MSCH (MBMS Scheduling Channel) is used to transmit scheduling information.

Logical channels can be divided into Control Channels (CCH) and Traffic Channels (TCH). The Control Channels (CCH) may include a Broadcast Control Channel (BCCH); a Paging Control Channel (PCCH); a Dedicated Control Channel (DCCH); a Common Control Channel (CCCH); a Shared Control Channel (SHCCH); an MBMS point-to-multipoint Control Channel (MCCH); and an MBMS Scheduling Channel (MSCH). The Traffic Channels (TCH) may include a Dedicated Traffic Channel (DTCH); a Common Traffic Channel (CTCH); and an MBMS point-to-multipoint Traffic Channel (MTCH).

The MAC layer is connected to the physical layer by transport channels and can be divided into a MAC-b sub-layer, a MAC-d sub-layer, a MAC-c/sh sub-layer, a MAC-hs sub-layer and a MAC-m sublayer according to the type of transport channel being managed. The MAC-b sub-layer manages a BCH (Broadcast Channel), which is a transport channel handling the broadcasting of system information. The MAC-c/sh sub-layer manages a common transport channel, such as a forward access channel (FACH) or a downlink shared channel (DSCH), which is shared by a plurality of terminals, or in the uplink the Radio Access Channel (RACH). The MAC-m sublayer may handle the MBMS data.

The possible mapping between the logical channels and the transport channels from a UE perspective is given in FIG. 3.

The possible mapping between the logical channels and the transport channels from a UTRAN perspective is given in FIG. 4.

The MAC-d sub-layer manages a dedicated channel (DCH), which is a dedicated transport channel for a specific terminal. The MAC-d sublayer is located in a serving RNC (SRNC) that manages a corresponding terminal, and one MAC-d sublayer also exists in each terminal. The RLC layer, depending of the RLC mode of operation supports reliable data transmissions and performs segmentation and concatenation on a plurality of RLC service data units (SDUs) delivered from an upper layer. When the RLC layer receives the RLC SDUs from the upper layer, the RLC layer adjusts the size of each RLC SDU in an appropriate manner based upon processing capacity and then creates data units by adding header information thereto. The data units, called protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the core network and broadcasts the CB message to terminals positioned in a specific cell or cells.

The PDCP layer is located above the RLC layer. The PDCP layer is used to transmit network protocol data, such as the IPv4 or IPv6, efficiently on a radio interface with a relatively small bandwidth. For this purpose, the PDCP layer reduces unnecessary control information used in a wired network, a function called header compression.

The radio resource control (RRC) layer located at the lowest portion of the third layer (L3) is only defined in the control plane. The RRC layer controls the transport channels and the physical channels in relation to setup, reconfiguration, and the release or cancellation of the radio bearers (RBs). The RB signifies a service provided by the second layer (L2) for data transmission between the terminal and the UTRAN. In general, the set up of the RB refers to the process of stipulating the characteristics of a protocol layer and a channel required for providing a specific data service, and setting the respective detailed parameters and operation methods. Additionally the RRC handles user mobility within the RAN, and additional services, e.g. location services.

The different possibilities that exist for the mapping between the radio bearers and the transport channels for a given UE are not all possible all the time. The UE/UTRAN deduce the possible mapping depending on the UE state and the procedure that the UE/UTRAN is executing. The different states and modes are explained in more detail below, as far as they concern the present invention.

The different transport channels are mapped onto different physical channels. The configuration of the physical channels is given by RRC signaling that is exchanged between the RNC and the UE.

As for physical channels, the DPCH channel can be established and used simultaneously between the UE and one or several cells of one or several NodeBs as shown in FIG. 5.

This situation where the UE has a DPCH established simultaneously to several cells is called soft handover. The case where the UE has established a DPCH simultaneously to several cells of the same NodeB is called softer handover. For the DPCH the UE is always combining the TPC commands from all radio links in the downlink, and uses always the command, which asks for the least transmit power (i.e. in the case one radio link says Up and the other one Down the UE chooses to decrease the transmit power).

The RLC layer (Radio Link Control) is a layer 2 protocol which is used in order to control the data exchange between the logical channels between the RNC and the UE. The RLC layer can currently be configured in 3 types of transfer modes: Transparent mode; Unacknowledged mode; and Acknowledged mode.

The different functionalities that are available depend on the transfer mode.

In acknowledged and unacknowledged mode SDUs (service data unit) can be split into smaller PDUs (protocol data units) that are used for transmission over the air interface. The transmitter side separates the SDU into PDUs, and based on control information that is added to the PDUs the receiver side re-assembles the PDUs in order to reconstruct the SDUs. Such control information is e.g. a PDU sequence number in order to detect whether a PDU has been lost, or a Length Indicator (LI) which indicates the beginning/end of a SDU inside an RLC PDU.

In unacknowledged mode, the receiver does not send a confirmation to the transmitter of correctly received PDUs, but the receiver side just reassembles PDUs to SDUs based on signaling information contained in the PDUs and transfers the complete SDUs to higher layers.

In acknowledged mode, the receiver sends acknowledgements for the correctly received PDU. The transmitter uses these acknowledgements in order to initiate retransmissions of missing PDUs. The acknowledgements are sent in certain conditions. There are several mechanisms foreseen in order to initiate the transmission of the acknowledgements for PDUs received by the receiver. Which mechanisms are activated is defined in the standard and/or configured by RRC signaling. One example for such a mechanism for the transmission of a status PDU is e.g. the reception of a PDU with a sequence number that does not correspond to the latest received sequence number increased by one, or when the receiver receives an indication from the transmitter in the RLC control information that an acknowledgment (also called Status) should be sent. The indication of the transmitter to send a status PDU is called Polling.

When the transmitter sends a Polling bit, a mechanism is defined in the UMTS standard if no Status report has been received after the transmission of the polling after a certain time. This mechanism initiates the transmitter to retransmit a PDU including the polling indicator and is called a timer poll.

Another mechanism counts the number of retransmissions of a PDU. In the case the retransmission exceeds a certain number (MaxDat) the transmitter starts the reset procedure, which is a procedure that allows setting of the transmitter and the receiver entity of a radio bearer using AM RLC mode to an initial state. When the Reset procedure is initiated the initiating entity transmits a Reset PDU to the terminating entity. The terminating entity acknowledges the reception of the Reset PDU by transmitting the Reset Ack PDU. If the initiating entity has not received the Reset Ack PDU after a certain time the initiating entity retransmits the Reset PDU. If the initiating entity has not received an Reset Ack PDU after a certain amount of retransmissions the initiating entity detects an unrecoverable error.

This example describes the situation where a dysfunction is detected in the operation of an RLC entity in RLC AM mode. Other mechanisms to detect a dysfunction are possible, are already described in the UMTS standard, or possible to be imagined and implemented. It is also possible to imagine detection mechanisms for RLC entities in UM mode, which would e.g. detect that undefined signaling information is included in the RLC PDU, or where higher layers detect that the reception/transmission of the UM entity is not behaving correctly.

As explained in the above there are mechanisms defined in the standard, and other mechanisms can be imagined that detect an unrecoverable error, which can correspond to a blocked situation, or a situation where the communication is disturbed.

If the UE detects an unrecoverable error situation as described in the standard the UE enters CELL_FACH state and sends a Cell update message to the NodeB/RNC eventually indicating that an unrecoverable error has occurred by setting the IE (Information Element) Cell update cause to the cause RLC unrecoverable error. The UE indicates by including the IE AM_RLC error indication (RB2, RB3 or RB4) that this unrecoverable error has either occurred for one of the SRBs with the Ids 2, 3 or 4, or by including the IE AM_RLC error indication (RB>4) that this error has occurred for one of the RBs using RLC AM mode with Ids higher than 4. The RNC can then send the Cell Update Confirm message and indicate that the RLC entities for SRBs with the Ids 2, 3 and 4, or for the RBs with Ids higher than 4 that use RLC AM mode shall be re-established by setting the IE RLC re-establish indicator (RB2, RB3 and RB4) and/or the RLC re-establish indicator (RB5 and upwards) to True.

The UM/AM RLC entity is also responsible for handling of ciphering and deciphering. In order to do so the RLC entity in the transmitter and the receiver maintain a COUNT-C number, which is composed of a Hyper frame number (HFN) and the RLC sequence number. The COUNT-C value, together with other information is used as input to a mathematical function that generates a bitstring. This bitstring and the RLC PDU except the SN are combined by the logical XOR operation, which ensures the ciphering of the data part of the RLC PDU. The HFN value is incremented each time the RLC SN wraps around (i.e. when the RLC SN reaches its highest value and restarts from 0). In the case the receiver misses a certain number of SNs, or in the case the SN received has been altered during the reception it is possible that the COUNT-C in the receiver and the transmitter are desynchronized. In this case the receiver is not capable to decipher correctly the information received. The receiver can detect the dysfunction of the deciphering entity by different mechanisms which are not further described here, and which are not part of the invention.

Regarding the RRC states, the RRC mode refers to whether there exists a logical connection between the RRC of the terminal and the RRC of the UTRAN. If there is a connection, the terminal is said to be in RRC connected mode. If there is no connect ion, the terminal is said to be in idle mode. Because an RRC connection exists for terminals in RRC connected mode, the UTRAN can determine the existence of a particular terminal within the unit of cells, for example which cell or set of cells the RRC connected mode terminal is in, and which physical channel the UE is listening to. Thus, the terminal can be effectively controlled.

In contrast, the UTRAN cannot determine the existence of a terminal in idle mode. The existence of idle mode terminals can only be determined by the core network to be within a region that is larger than a cell, for example a location or a routing area. Therefore, the existence of idle mode terminals is determined within large regions, and, in order to receive mobile communication services such as voice or data, the idle mode terminal must move or change into the RRC connected mode. The possible transitions between modes and states are shown in FIG. 6.

A UE in RRC connected mode can be in different states, e.g. CELL_FACH state, CELL_PCH state, CELL_DCH state or URA_PCH state. Other states could be envisaged of course. Depending on the states the UE carries out different actions and listens to different channels. For example a UE in CELL_DCH state will try to listen (amongst others) to DCH type of transport channels, which comprises DTCH and DCCH transport channels and which can be mapped to a certain DPCH, DPDSCH, or other physical channels. The UE in CELL_FACH state will listen to several FACH transport channel, which are mapped to a certain S-CCPCH, the UE in PCH state will listen to the PICH channel and to the PCH channel, which is mapped to a certain S-CCPCH physical channel.

Regarding the reading of system information, the main system information is sent on the BCCH logical channel, which is mapped on the P-CCPCH (primary Common Control Physical Channel). Specific system information blocks can be sent on the FACH channel. When the system information is sent on FACH the UE receives the configuration of the FACH either on the BCCH that is received on P-CCPCH or on a dedicated channel. When system information is sent on the BCCH (i.e. via the P-CCPCH) then in each frame or set of two frames the SFN (System frame number) is sent which is used in order to share the same timing reference between the UE and the NodeB.

The P-CCPCH is always sent using the same scrambling code as the P-CPICH (primary common pilot channel), which is the primary scrambling code of the cell. Each channel uses a spreading code as commonly done in WCDMA (Wideband Code Division Multiple Access) systems. Each code is characterized by its spreading factor (SF), which corresponds to the length of the code. For a given spreading factor the number of orthogonal codes is equal to the length of the code. For each spreading factor the given set of orthogonal codes as specified in the UMTS system are numbered from 0 to SF-1.

Each code can thus be identified by giving its length (i.e. spreading factor) and the number of the code. The spreading code that is used by the P-CCPCH is always of a fixed SF (spreading factor) 256 and the number is always the number 1. The UE knows about the primary scrambling code either by information sent from the network on system information of neighbouring cells that the UE has read, by messages that the UE has received on the DCCH channel, or by searching for the P-CPICH, which is always sent using the fixed SF 256, the spreading code number 0 and which always transmits a fixed pattern.

The system information comprises information on neighbouring cells, configuration of the RACH and FACH transport channels, and the configuration of MICH and MCCH, which are channels that are dedicated channels for the MBMS service.

Each time the UE is changing the cell it is camping (in idle mode) or when the UE has selected the cell (in CELL_FACH, CELL_PCH or URA_PCH) state the UE verifies that it has valid system information. The system information is organized in SIBs (system information blocks), a MIB (Master information block) and scheduling blocks. The MIB is sent very frequently and gives timing information of the scheduling blocks and the different SIBs. For SIBs that are linked to a value tag the MIB also contains information on the last version of a part of the SIBs. SIBs that are not linked to a value tag are linked to an expiration timer. SIBs linked to an expiration timer become invalid and need to be reread if the time of the last reading of the SIB is bigger than this timer value. SIBs linked to a value tag are only valid if they have the same value tag as the one broadcast in the MIB. Each block has an area scope of validity (Cell, PLMN, equivalent PLMN) which signifies on which cells the SIB is valid. A SIB with area scope Cell is valid only for the cell in which it has been read. A SIB with area scope PLMN is valid in the whole PLMN, a SIB with the area scope equivalent PLMN is valid in the whole PLMN and equivalent PLMN.

In general, the UEs read system information when they are in idle mode, CELL_FACH state, CELL_PCH state or in URA_PCH state of the cells that they have selected/the cell that they are camping on. In the system information they receive information on the neighbouring cells on the same frequency, different frequencies and different RAT (Radio access technologies). This allows the UE to know which cells are candidates for cell reselection.

Regarding the delays in communication, the conventional art call setup procedure takes a relatively long time due to the different message exchanges shown in FIG. 7. Namely, FIG. 7 shows the distribution of the delays in the call setup procedure. The delay that needs to be imputed to the network is the delay between the reception of the uplink message and the transmission of the downlink message. The graph shows the times between the reception/transmission of the messages in the RRC layer of the UE, i.e. does not include the time that it takes to send the uplink messages via the RLC.

One part of the delay is due to the setup of the radio bearers. The delay between the transmission of the radio bearer setup and the radio bearer setup complete is mostly due to the activation time. The UE will only transmit the radio bearer setup complete message once the activation time has expired and the UE has synchronized on the new radio link.

FIG. 8 shows the synchronized radio bearer setup (reconfiguration) in more detail. In step 1, the procedure is initiated by the reception of a Rab assignment Request. Instead the procedure could be triggered by any other procedure. The steps 2 to 9 are related to the need to setup a new radio bearer, the allocation of the transport resources and the resources inside the NodeB. In step 10 the RNC decides on an activation time that is sent in the step 11 and 12 to the NodeB and the UE. The NodeB and the UE are then waiting for the activation time to be reached to switch to the new configuration in step 13a and 13b. In step 14 the UE confirms the successful reconfiguration to the RNC. The RNC indicates the successful completion of the reconfiguration.

The gray shaded region, where basically the UE and the NodeB are just waiting for the expiry of the activation time corresponds to delay introduced, which is wasted in the case that the procedure is successful. This delay is necessary in the case that the message on the UE needs to be retransmitted by RLC. Also in the case the UE wants to send a failure message on the old RL some minimum delay is needed in order to allow this message to go through, and evtl. to cancel the reconfiguration in the NodeB by a separate message from the RNC. Therefore a means for decreasing this delay in the case everything works well (no RLC retransmission, no failure message) is necessary.

FIG. 9 shows the unsynchronized radio bearer setup (reconfiguration) in more detail. In the case of the unsynchronized reconfiguration, the RNC initiates synchronously in step 2 the reconfiguration towards the UE indicating that the reconfiguration shall be applied immediately, and in step 4 towards the NodeB, also indicating that the reconfiguration shall be applied immediately. Because there is no means to control the delay before the UE/NodeB will apply the configuration there is a high risk that the UE will not be able to achieve synchronization on the new RL, and therefore will leave CELL_DCH state due to a physical channel failure.

FIG. 10 shows a hard handover procedure in more detail. Using a hard handover is already one possibility to avoid the activation time. In steps 1 to 10, the RNC establish on the NodeB a new independent configuration, with new transport resources for all transport channels. The NodeB tries to obtain synchronization to the UE by transmitting on the downlink with a fixed power that has been received form the RNC. In step 11, the UE receives the message to change the configuration used for the uplink and the downlink. In step 12, the UE tries to receive the downlink that is newly established and (optionally) starts to transmit in the uplink (depending whether the synchronization procedure A is used or not). The NodeB will detect that the synchronization of the old RL is lost, and that the synchronization with the new RL is gained, and report this to the RNC with the messages RL Link Failure for the old RL and RL Restore for the new Radio Links (step 13, 14). The RNC can then delete the old Radio Links (step 15, 16). The UE will indicate the successful Radio Bearer Setup Complete message (step 17), and the RNC can acknowledge the successful RAB setup to the CN (step 18).

The problem with this scenario is that this implies that during the reconfiguration the resources for the old and the new configuration are used. This wastes capacity on the air interface (two sets of DL spreading codes are reserved) in the NodeB, where the NodeB needs to decode two different UE configurations and in the transport, and the RNC.

Next, the aspects of uplink scrambling code, pilot pattern and synchronization will be considered.

The current CDMA systems use scrambling codes, spreading codes and pilot patterns in order to allow synchronization and the exchange of data blocks from different transport channels, which are coded and multiplexed together. In the UMTS system in the uplink the UE transmits a pilot pattern, which is spread with a spreading code as defined in the standard, and scrambled with a fixed complex scrambling code.

In the UMTS system the pilot pattern is sent on the DPCCH physical channel code and is time multiplexed with other DPCCH information e.g. the transmit power commands as shown in FIG. 11 for the DPDCH/DPCCH frame structure in the uplink.

The pilot pattern is sent at predefined time instants during each slot depending on the slot format chosen and is repeated at each frame. In the uplink, the PDCCH is sent always using the same spreading factor and spreading code. Therefore, the (time) instant where the pilot pattern is sent is always the same. In the case of compressed mode (i.e. when transmissions are interrupted e.g. in order to allow the UE to listen to a different frequency for doing measurements) the pattern (i.e. slot format) also changes.

FIG. 12 shows an example of how the generation of a signal in the uplink is performed.

The DPDCH on which the different transport channels are mapped is spread with a different spreading code (one or several spreading codes). The spreading factor used for the DPDCH can change dynamically from one TTI to the next one.

Since the pilot patterns have a specific sequence this allows that the NodeB calculates the timing of the UE transmission by correlating the received sequence with the expected sequence, shifted by different times T as shown in FIG. 13. This allows the NodeB to detect the timing of the uplink signal, and to verify whether the UE signal is contained in the received signal by comparing the absolute value of the sum of the complex value to a threshold. This is one way of doing, there are different ways, and the intention here is just to highlight that it is possible for the NodeB to check the timing of the uplink transmission, and to check whether the pilot sequence spread with a given spreading code and scrambled with a UE specific scrambling code is transmitted.

FIG. 13 shows an example of how detection of synchronization can be performed.

Now referring to FIG. 14, the concept of a Code Tree and Code Management will be considered. In the UMTS system the spreading codes of a length of $2^n$ are used. These spreading codes can be generated out of a tree, which gives branches of orthogonal spreading codes. For each possible length of spreading codes there exists the number equal to the spreading factor of orthogonal codes. These codes are often grouped as a tree as shown in FIG. 14. All codes of the same spreading factor are orthogonal. The codes of different spreading factors are orthogonal in the case that the code with higher spreading factor is not part of the branch of the code with lower spreading factor. In the figure when the code of length 4 with number 0 is used the codes 0 and 1 of the length 8 cannot be used any more because they are not orthogonal, but the codes 2 and 3 of the length 8 can be used. If the code 1 of the length 2 is used the codes below in this branch cannot be used any more in parallel.

Next, the concepts of Downlink scrambling code, pilot pattern and synchronization will be considered.

In the downlink the DPCCH is time multiplexed with DPDCH and spread with the same spreading codes. Therefore the instants where pilot patterns are sent can vary depending on the spreading factor, and depending on the fact whether compressed mode is used or not.

FIG. 15 shows an example of how the generation of a signal in the downlink is performed.

Because the DPDCH is spread with the same spreading code as the pilot patterns and the other physical layer information (i.e. the DPCCH) each time the spreading factor changes the pattern with which the pilot bits and the TPC bits are sent, and the pattern with which the other physical channel information is sent is different. This means that in the case the new configuration includes a spreading factor different from the spreading factor before the reception of the DPCCH is not possible any more if the UE tries to receive a different spreading factor. The format of the DPCCH can also be changed during the reconfiguration without the changing the spreading factor.

The DPCH frame structure and its related DPCH timing characteristics will now be explained with reference to FIGS. 16 and 17.

FIG. 16 shows an example of the frame structure of the DPCH, and the structure of the DPCCH and the DPDCH that is transmitted.

FIG. 17 shows an example of DPCH timing. The DPCH, i.e. the timing of the DPDCH and DPCCH are offset compared to the Primary SCH. This means that the UE knows when the DPCCH is transmitted due to the parameter $\tau_{DPCH}$ that it has received from the network beforehand.

Regarding Transport Format Combination Indicators (TFCIs), in the UTRAN system different transport channels are mapped together on a Coded Composite Transport Channel (CCTrCH), which is mapped on a DPDCH. Each transport channel can apply different Transport Formats (TFs), each transport format including a distinct set of parameters. When different Transport channels are multiplexed together on a CCTrCH the combination of the different TFs of each transport channel indicates a Transport Format Combination, which allows the receiver and the transmitter to determine how the coding of the different transport channels is done. Therefore in order to decode the DPDCH the UE needs to know the TFC. There are different possibilities in the UTRAN standard:

In the case that the blind transport format detection is used the UE tries to decode the DPDCH with different TFC until the CRC code indicates that the information of all transport channels is received correctly. Alternatively the UTRAN can send the Transport Format Indicator, which is an indicator that signals the transport format combination of the different transport channels sent on the DPCCH.

DISCLOSURE OF INVENTION

Technical Solution

One aspect of the present invention involves the recognition by the present inventors of the drawbacks in the related art. Namely, in the related art problem is that the procedures to setup, release or change the configuration of radio bearers are either supposed to be done in a synchronized manner, implying an activation time given by the RNC to the NodeB and the UE and therefore take a long time, or imply the use of non-synchronized reconfigurations which means that the UE/NodeB might loose the synchronization which implies that the call might be lost.

Based upon such recognition, improvements to the setup, release or change in the configuration of radio bearers have been made according to the present invention. More specifically, the invention provides a method and system that allows synchronization of changes to configurations in a telecommunication system and has applicability to various types of telecommunication technologies. Accordingly, the fast reconfiguration scheme of the present invention results in a decrease in call set up delays.

BRIEF DESCRIPTION OF THE DRAWINGS

The accompanying drawings, which are included to provide a further understanding of the invention, are incorporated in and constitute a part of this application, illustrate embodiment(s) of the invention and together with the description serve to explain the principle of the invention. In the drawings.

MODE OF THE INVENTION

Figure 1:
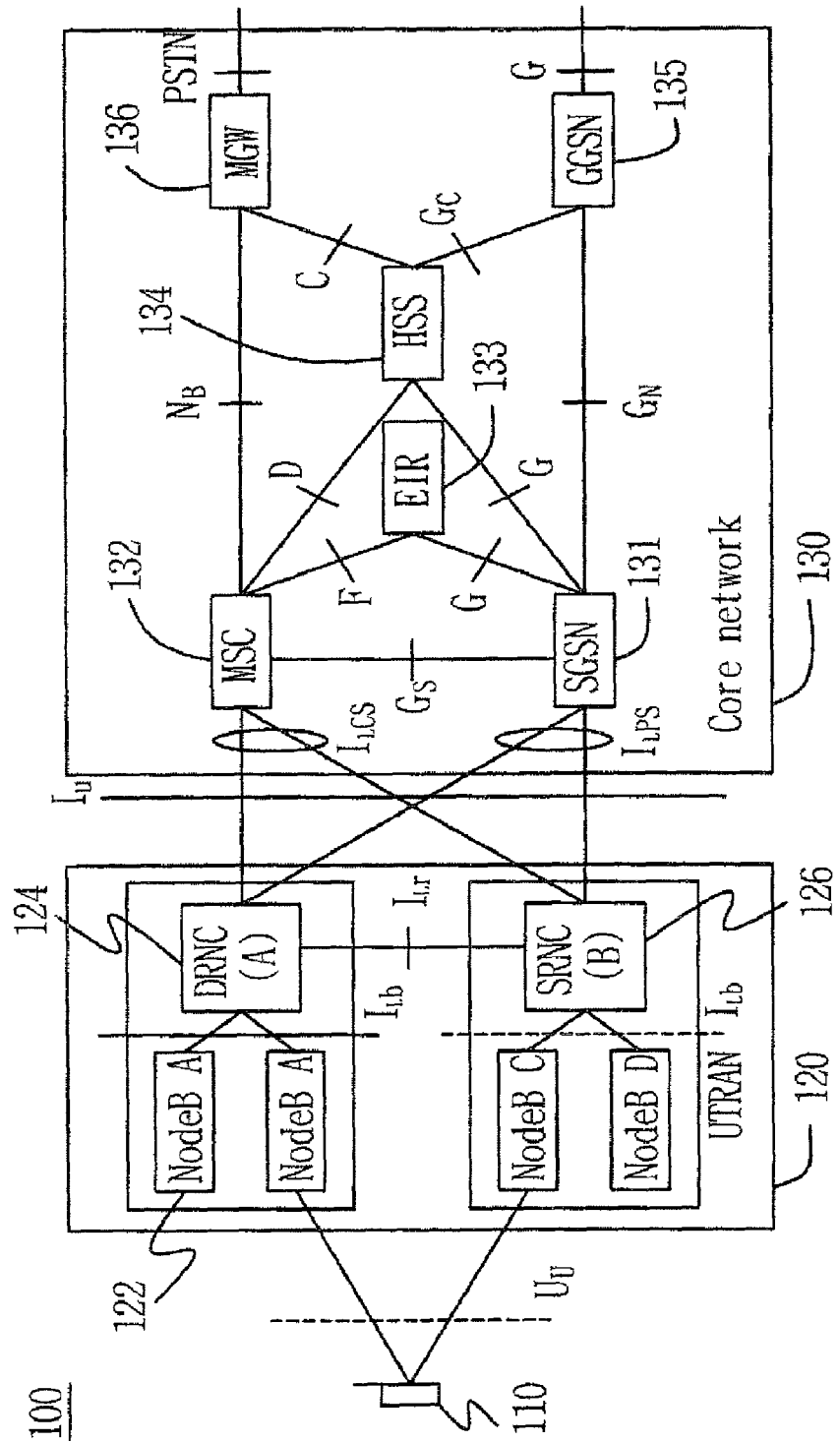
FIG. 1 shows a general UMTS network architecture.
Figure 2:
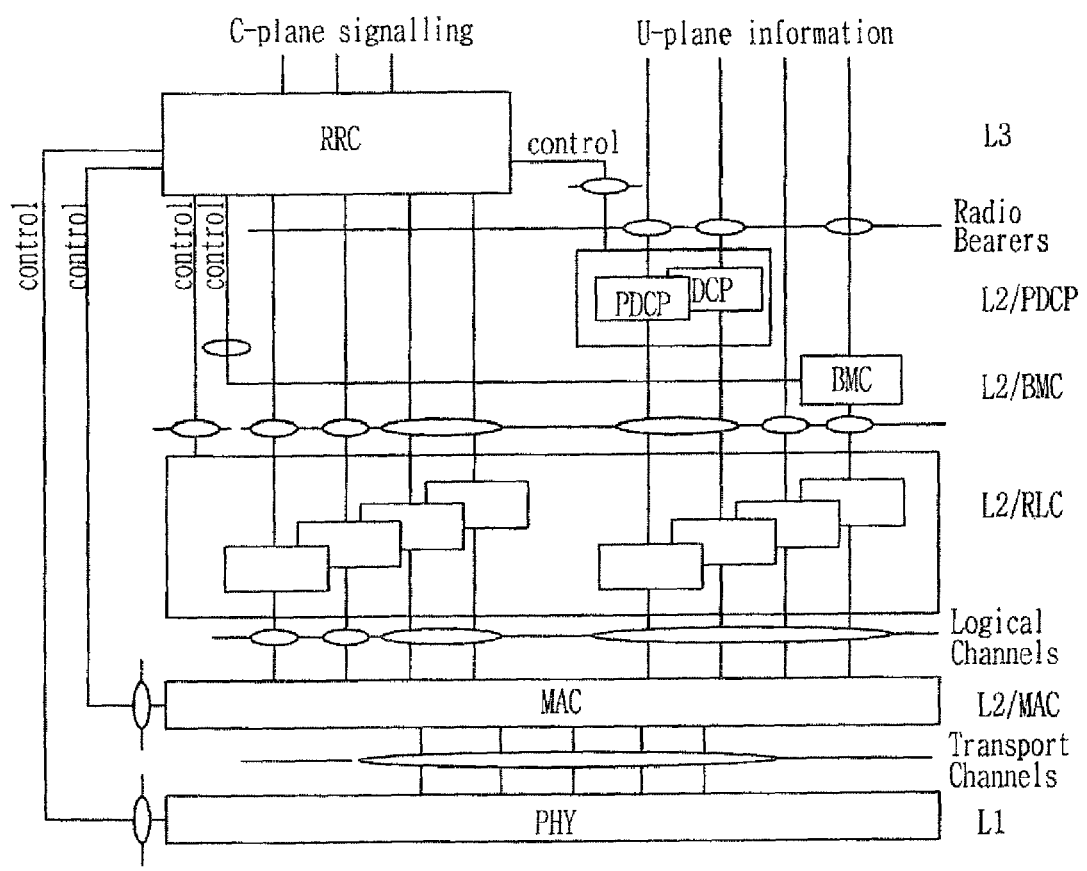
FIG. 2 shows a radio (wireless) interface protocol structure between the UE and UTRAN based upon the 3GPP radio access network.
Figure 3:
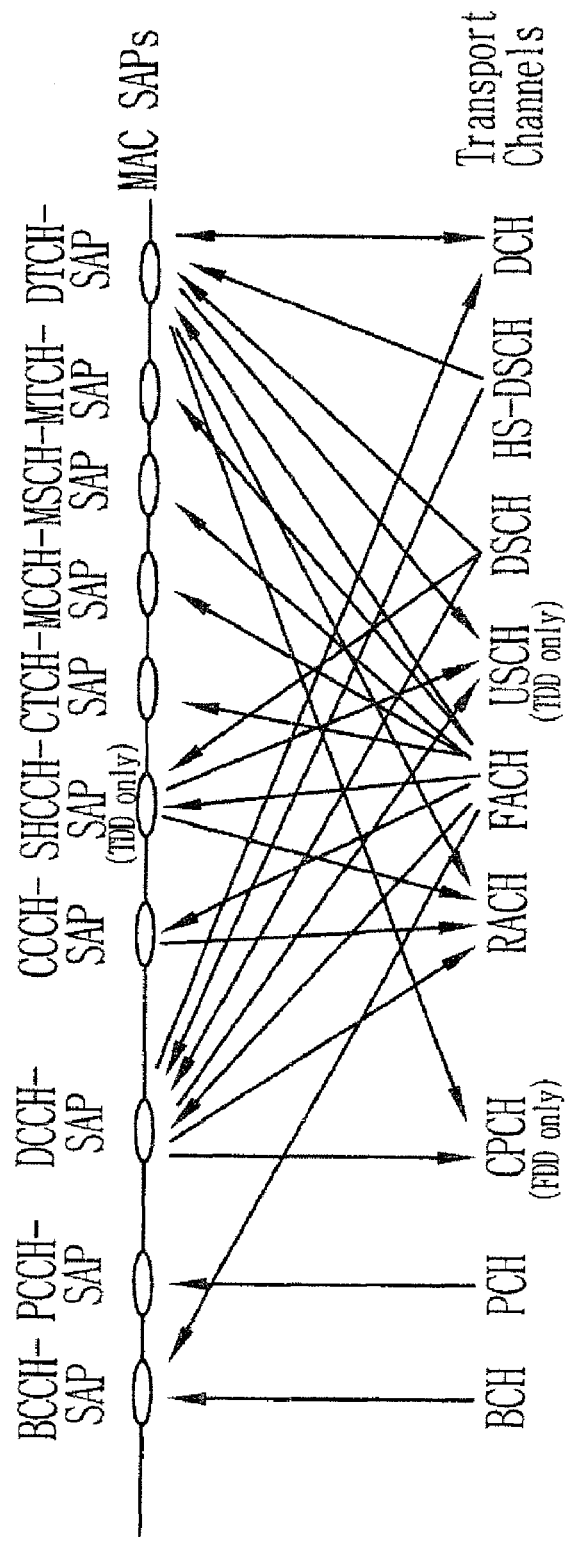
FIG. 3 shows logical channels mapped onto transport channels, as seen from the UE side.
Figure 4:
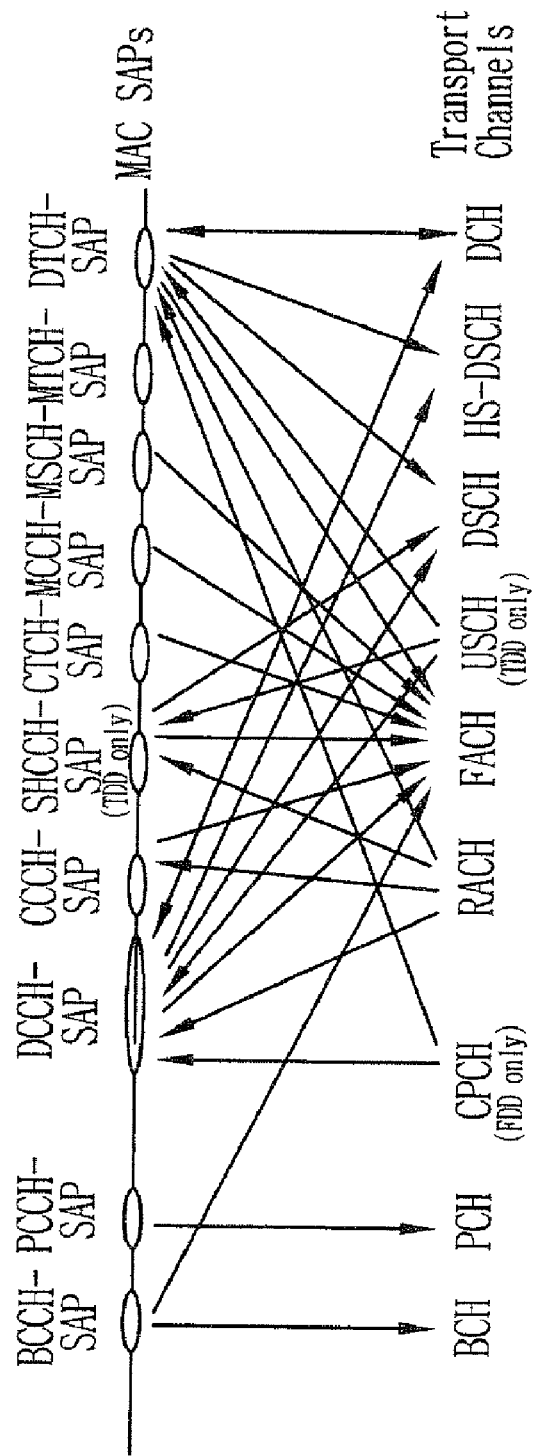
FIG. 4 shows logical channels mapped onto transport channels, as seen from the UTRAN side.
Figure 5:
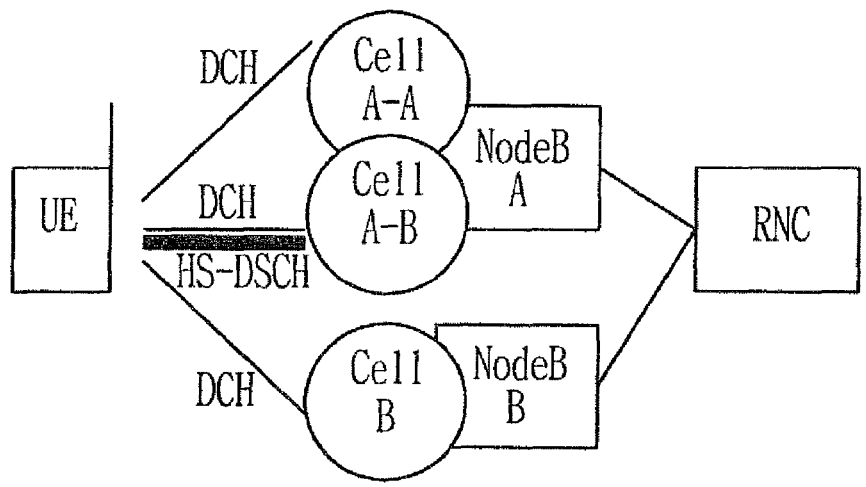
FIG. 5 shows a DPCH established and used simultaneously between the UE and one or several cells of one or several NodeBs.
Figure 6:
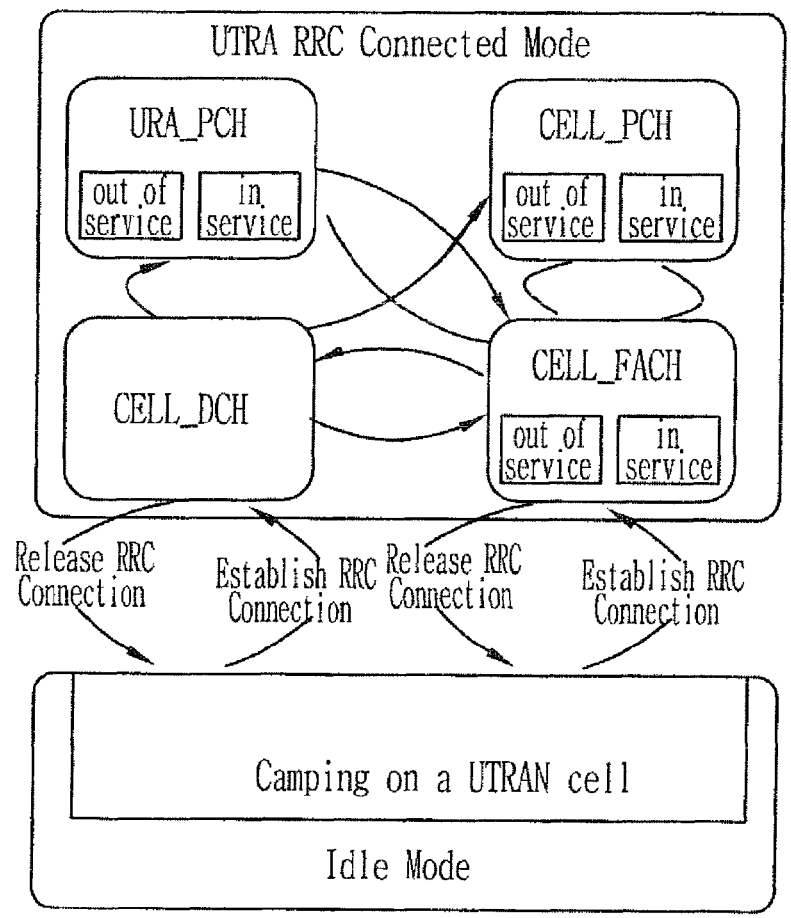
FIG. 6 shows the RRC connection modes and states of a UE.
Figure 7:
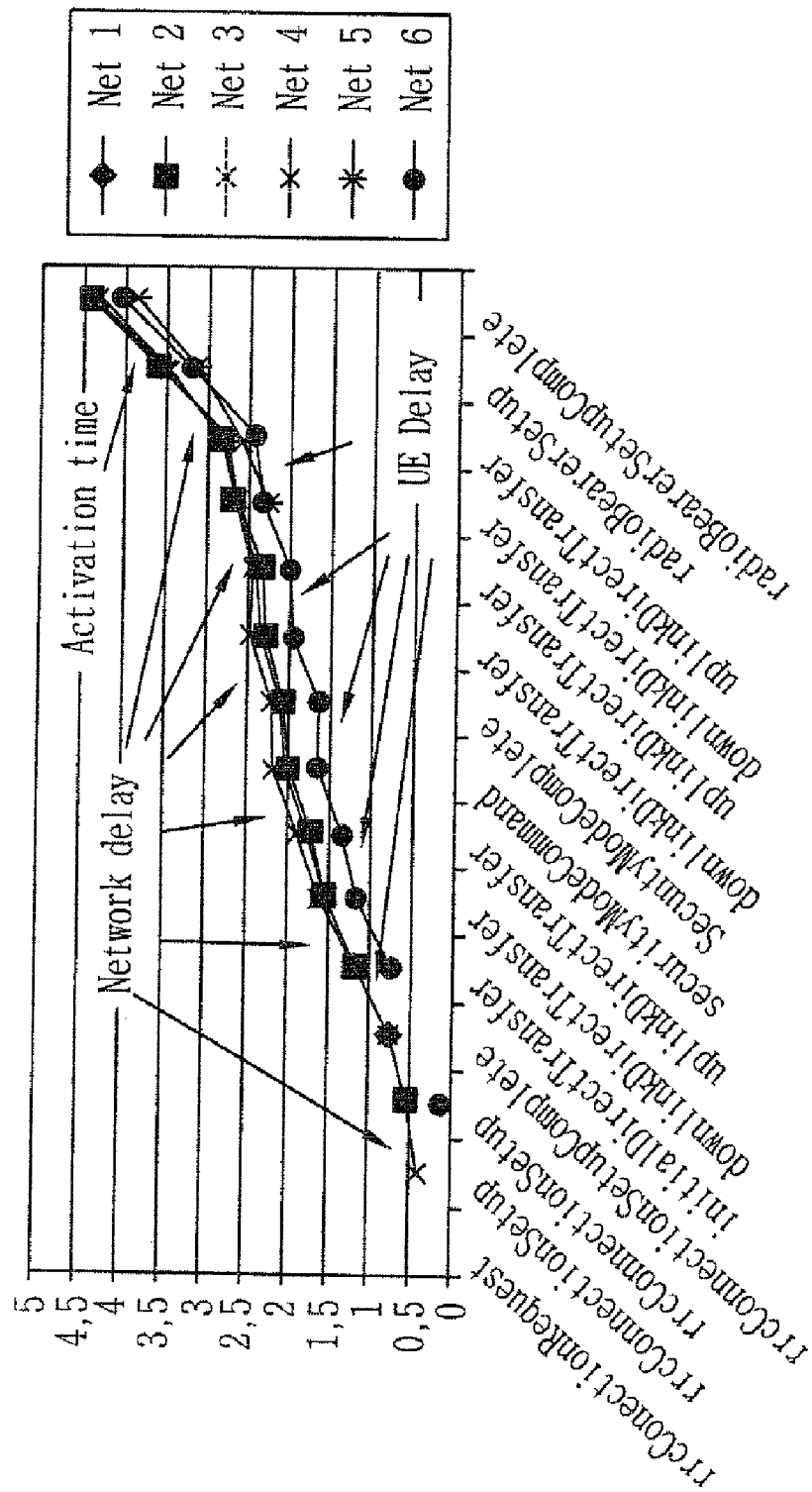
FIG. 7 shows a distribution of the delays in call setup.
Figure 8:
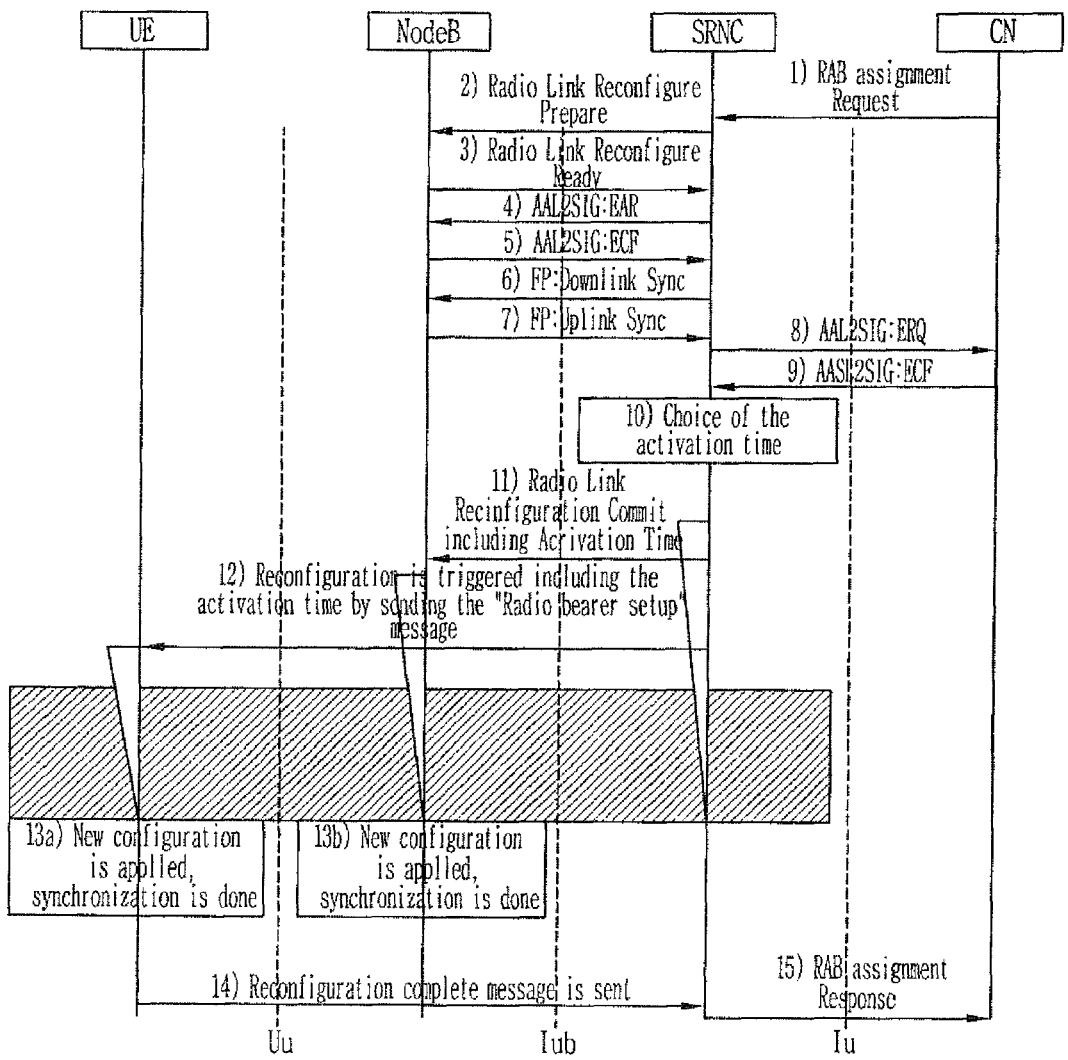
FIG. 8 shows a synchronized reconfiguration situation according to the related art.
Figure 9:
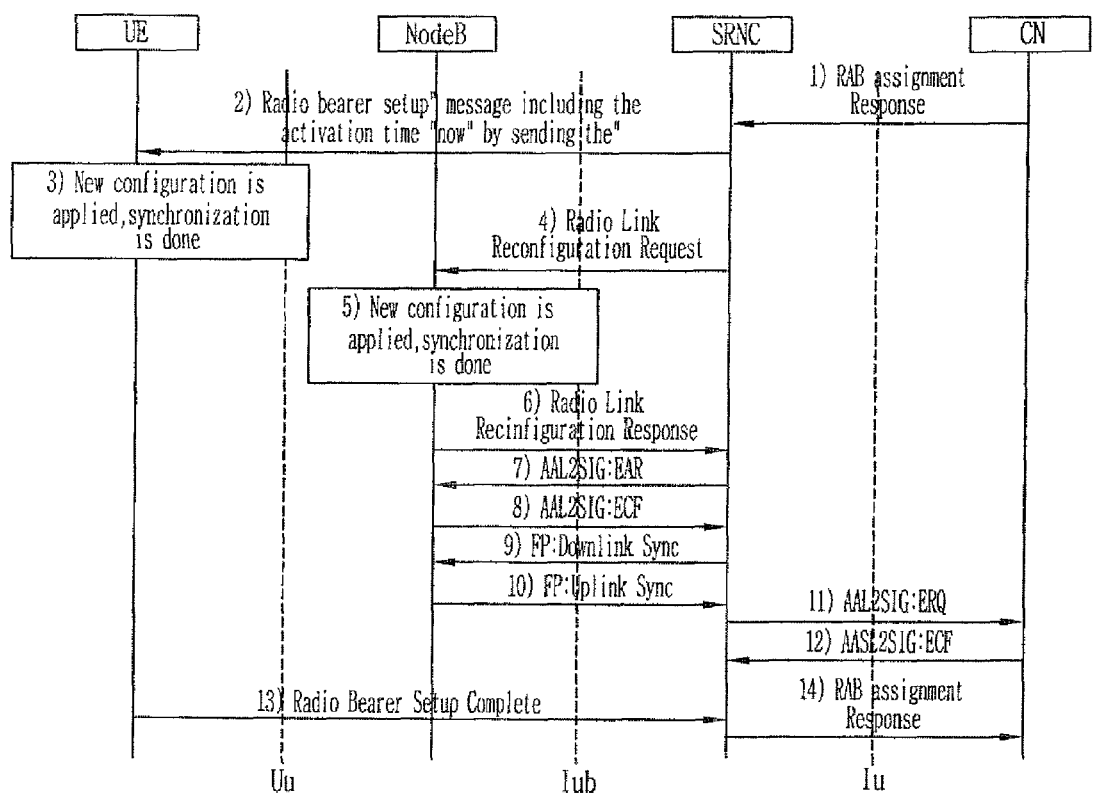
FIG. 9 shows an unsynchronized reconfiguration situation according to the related art.
Figure 10:
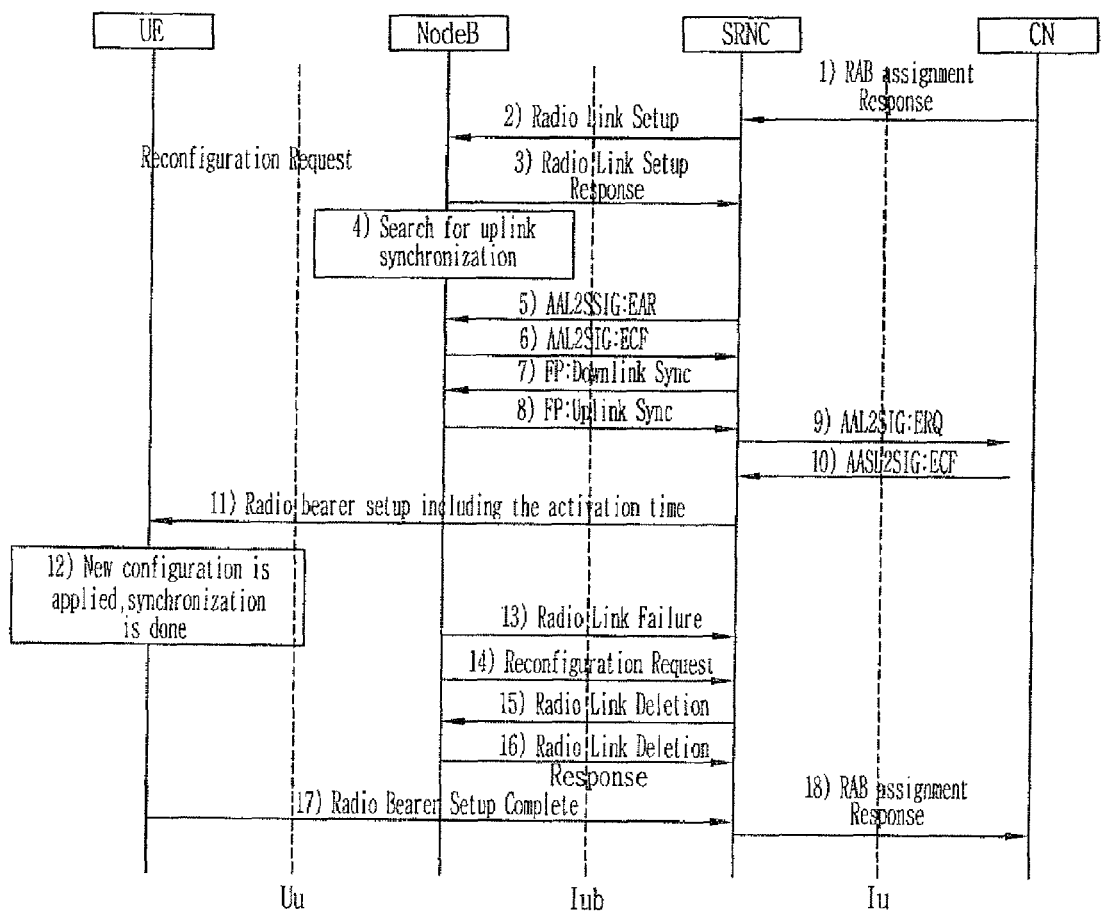
FIG. 10 shows a hard handover situation according to the related art.

The present invention is described as being implemented in a UMTS mobile communications system. However, the present invention may also be adapted and implemented in communications systems operating under other types of communication specifications, because the concepts and teachings of the present invention could be applied to various communication schemes that operate in a similar manner based upon common techniques. Non-limiting exemplary embodiments of the present invention are explained below with reference to the attached Figures.

In one embodiment of the present invention, the RNC may indicate the new configuration including a changed uplink scrambling code to the NodeB and the UE, with a special indication to the UE that the new configuration should be applied as soon as possible, and to the NodeB that the new configuration shall be applied upon the detection of the new scrambling code in the uplink.

In one optional part of the invention the RNC indicates to the UE together with the new configuration an outage time during which the UE should continue the uplink transmission even when the downlink transmission stops. The NodeB tries to synchronize to receive the new uplink scrambling code, and upon detection of the new uplink scrambling code starts to transmit in the downlink using the new configuration.

In another embodiment of the present invention, the NodeB may synchronously transmit the relevant control part of the downlink transmission of the old and the new configuration in order to maintain synchronization and inner loop power control with the UE before and after the change of the configuration. The NodeB might transmit the control part only during the frames where no data part is transmitted in the downlink.

Upon detection of the new uplink scrambling code the NodeB applies the new configuration for the transmission in the downlink.

In yet another embodiment of the present invention, the UE may indicate that it will apply the new configuration a predefined time interval before the change in the configuration either by: (1) Changing the uplink scrambling code; (2) Sending a specific signal to the NodeB, e.g. a bit pattern in the uplink, spread by a specific spreading code and scrambled with a specific scrambling code; (3) Using a specific set of TFCIs; (4) Sending a specific bit pattern in the Feedback Information (FBI) field; or (5) Any other signaling procedure.

The RNC signals in a message to the NodeB and the UE which of the above schemes shall be applied for the change of the configuration, and indicates the relevant information, such as the special TFCI values to be used, the length of the period of outage upon change of the uplink spreading code during which the UE shall continue to transmit in the uplink, the time between the indication and the use of the new configuration in the uplink and/or downlink.

In addition the NodeB could indicate to the RNC the minimum length of the period of outage upon change of the uplink spreading code during which the UE shall continue to transmit in the uplink, the time between the indication and the use of the new configuration in the uplink and/or downlink based on the NodeB performance.

The present invention will be described in more detail as follows.

Figure 18:
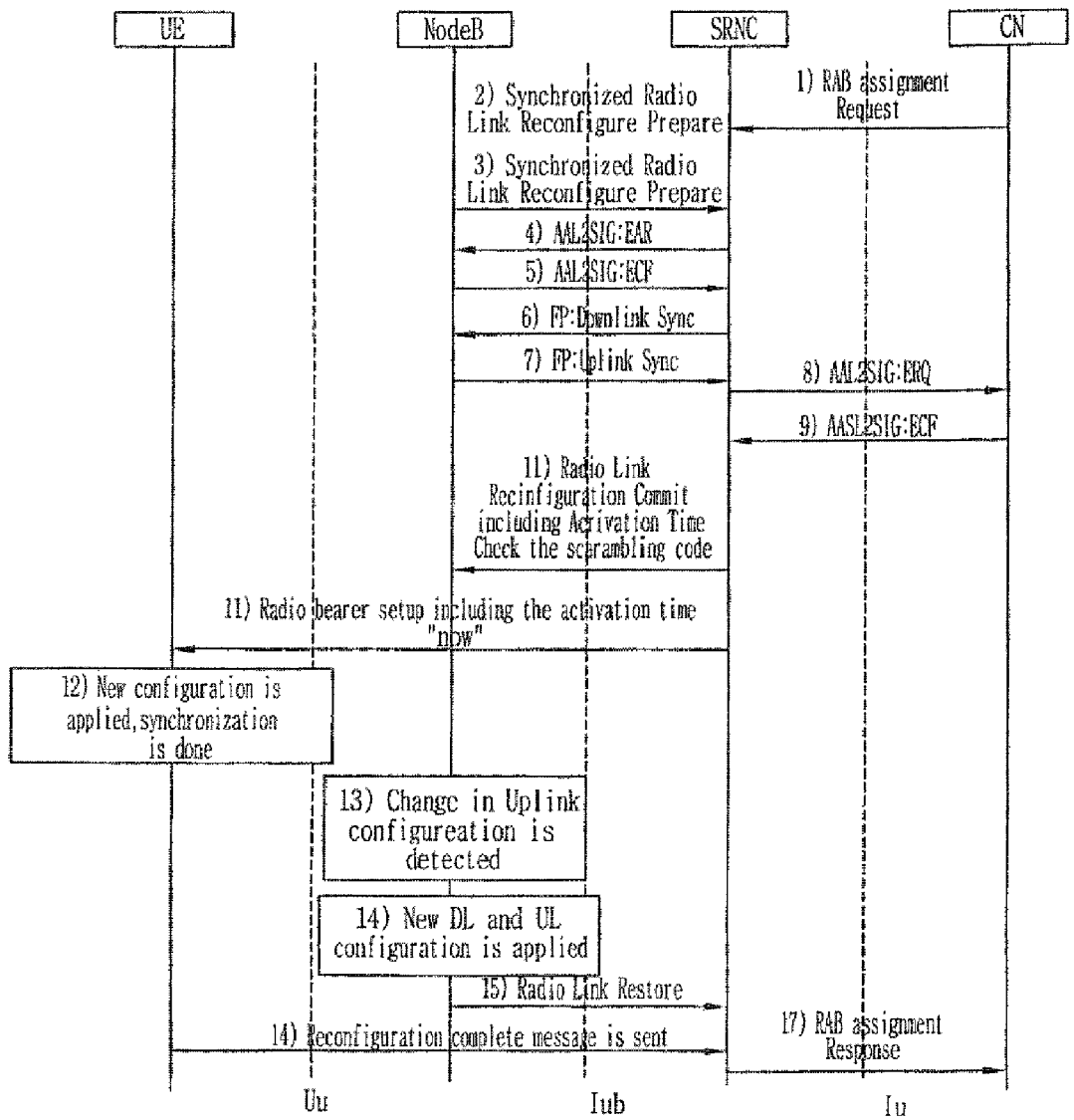
FIG. 18 shows an enhanced quasi-synchronized reconfiguration scheme according to the present invention.

FIG. 18 shows an exemplary embodiment of the present invention, namely, a scheme for enhanced quasi-synchronized reconfiguration.

In step 1, a new RAB is indicated to be setup by the CN. Alternatively this could also be used just to change a configuration in which the trigger is based on the RNC implementation, or in order to release a RAB.

In steps 2 through 9, the RNC sends the new configuration to the NodeB in the Synchronized Radio Link Reconfigure Prepare message and the NodeB reserves the resources. The NodeB indicates that the configuration is accepted with the Synchronized Radio Link Reconfigure Ready message, and indicates the transport resources. (Legacy procedure).

In step 10, the RNC gives to the NodeB the indication that the new configuration shall only be applied when the UE changes the uplink scrambling code, or upon any other indication to the NodeB (New indication). This could also be indicated already in the Synchronized RL Reconfiguration Preparation message (new Indication that the change shall be done upon detection of the new scrambling code in the uplink), RL Setup (new Indication that this is linked to a UE context that already exists such that partly the same transport resources are used) or Unsynchronized RL Reconfiguration (new Indication that the reconfiguration should be done only after the synchronization is detected).

In step 11, the NodeB would start to search for the uplink synchronization of the new uplink scrambling code whilst receiving the UE on the old scrambling code (New method). As one alternative the NodeB could already send the DPCCH of the new configuration during the DTX periods of the DPDCH of the old configuration as explained in (1) Simultaneous transmission of old and new configuration with different $\tau_{DPCH}$, described hereafter. The RNC may send the new configuration to the UE indicating that it should apply the configuration immediately. (Legacy procedure) Optionally, a new indication could be added such that the UE does not count as a RL failure when the DL is not received directly during a given time period. In order to be able to synchronize the transmission of the new configuration from the NodeB, it would be also possible to have an indication on the physical channel as explained in (2) Indication of the shift to the new configuration via the physical layer, described hereafter.

In step 12, the UE changes to the new configuration, and amongst others applies the new TFCIs. In the case the slot format in the downlink does not change (i.e. the spreading factor is the same, and the slot format is not changed) the UE would not detect any outage because the NodeB would continue to use the same pattern for the transmission of the Pilot, TFCI and TPC pattern.

In step 13, the NodeB would loose the uplink synchronization on the old scrambling code and detect that it receives the UE on the new scrambling code. In the gap between the detection by the NodeB of the old and the new scrambling code the NodeB would send power up signals as TPC commands.

In step 14, the NodeB would immediately apply the new configuration in the uplink and the downlink, e.g. the new TFCI for the uplink and the downlink. In the case that the slot format changes in the downlink the UE would expect that the NodeB transmits with the new configuration. In this case, there are two possibilities:

a) The NodeB transmits in parallel the new configuration. This however is only possible in the case that before and after the reconfiguration non overlapping spreading codes are used.

b) The NodeB switches to the new configuration upon detection of the change in the uplink scrambling code or any additional indication to the NodeB. This implies that the UE will not receive the NodeB during the time of the reconfiguration An alternative would be to indicate to the UE that when the new configuration is applied the UE should tolerate a certain outage. The length of this outage (number in slots/frames/seconds) would be given to the UE from the RNC in step 11.

In step 15, the NodeB would indicate that the reconfiguration is successful to the RNC by sending a message, e.g. the Radio Link Restore message in order to indicate that the new format is used now and that the new downlink transport channels can be used, and that data can be received on the uplink transport channels. In step 16, the UE sends the Reconfiguration Complete message to the RNC. In step 17, the RAB is considered as established, and thus the RNC can indicate that the RAB is complete through the RAB assignment response message.

(1) Simultaneous transmission of old and new configuration with different $\tau_{DPCH}$.

In FIG. 18, in steps 12 to 14, the NodeB stops the reception using the old configuration upon detection of the new scrambling code sent by the UE and then starts the transmission sending the new configuration. In practice the NodeB only needs to interrupt the transmission mostly in the case that the downlink scrambling code and/or the slot format/and or offset of the DPCH compared to the SCH are different. In order to allow the UE to obtain the synchronization immediately during reconfiguration even if the spreading factor/slot format/offset of the DPCH compared to the SCH are different, and to avoid the break in the reception during the time where the NodeB detects that the UE has changed the uplink scrambling code and until the NodeB starts the transmission of the new configuration in the downlink it is possible to transmit simultaneously the old configuration and the new configuration as shown FIG. 19.

Figure 19:
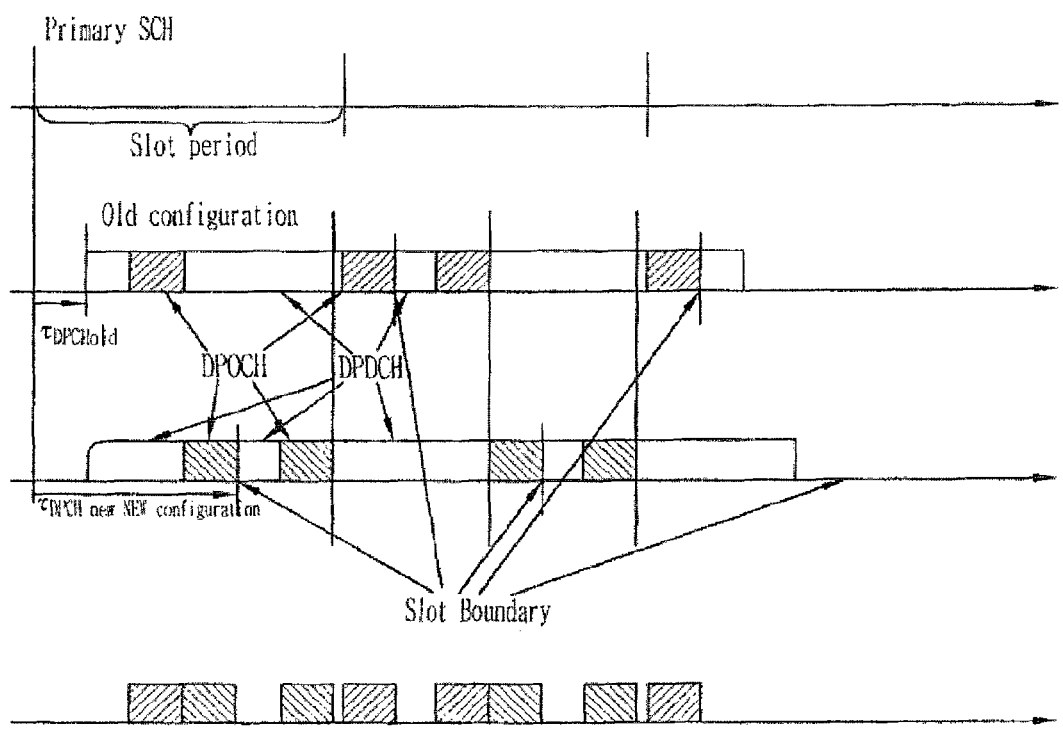
FIG. 19 shows a simultaneous transmission with the old and new configurations according to the present invention.

In FIG. 19, it is shown how via the shift of the DPCH of the new configuration with respect to the old configuration it is possible to transmit the DPCH of the old configuration and the new configuration simultaneously. However this supposes that the DPDCH is at least partly not transmitted. Alternatively not the complete DPCCH of the new/old configuration is transmitted but only the most important information, i.e. the TPC bits, or the pilot bits, or the feedback bits.

Figure 20:
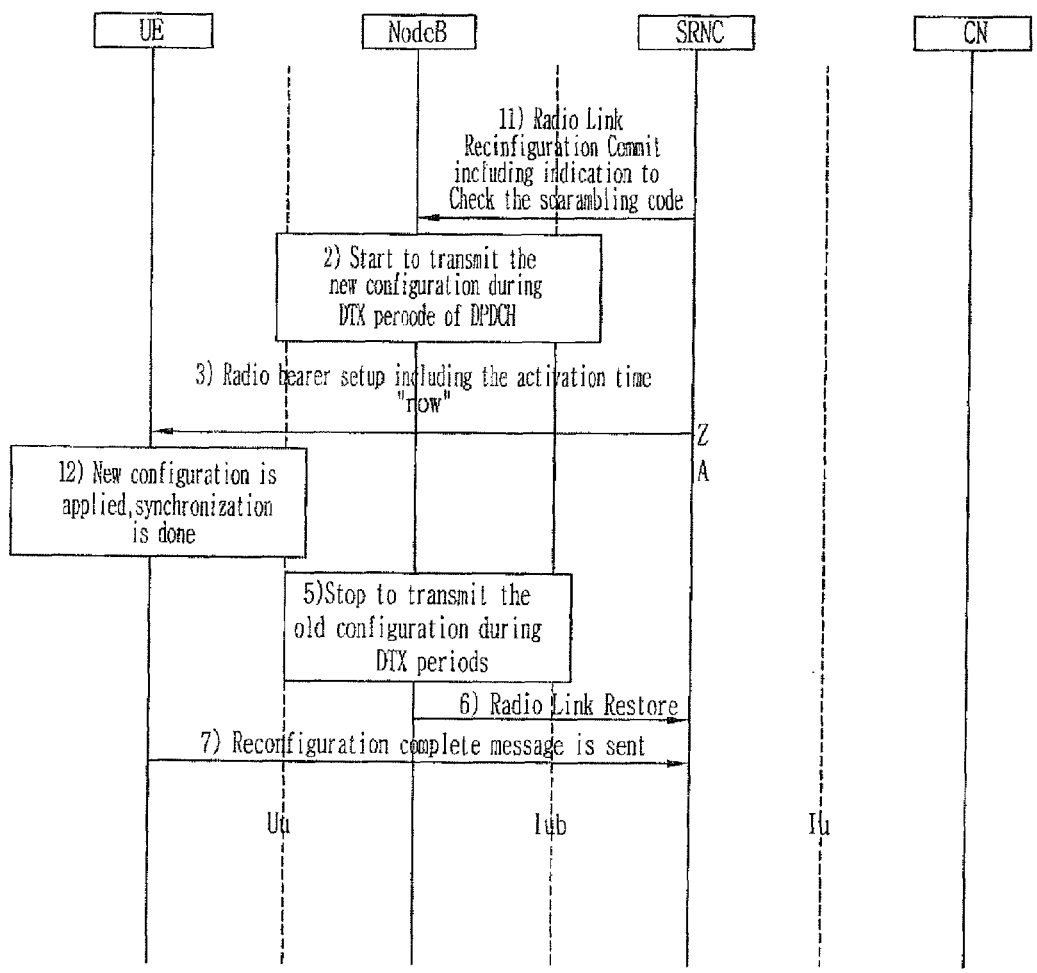
FIG. 20 shows a scheme for simultaneous transmission according to the present invention.

FIG. 20 highlights an alternative to the steps 10-16 of FIG. 18. In FIG. 20, upon reception of the indication to check for the reception of the new uplink scrambling code in the Radio Link Reconfiguration Commit including the indication that the start of the new configuration depends on the change in the uplink scrambling code the NodeB starts to transmit the new configuration during periods where the DPDCH is not transmitted in the downlink. This is only possible in the case that the $\tau_{DPCH}$ for the new configuration compared to the old configuration is such that the DPCCH of the new configuration falls into periods where nothing is transmitted. This allows that the used spreading codes before and after the reconfiguration do not need to be orthogonal any more, i.e. they can be chosen in the same branch.

(2) Indication of the shift to the new configuration via the physical layer

Figure 21:
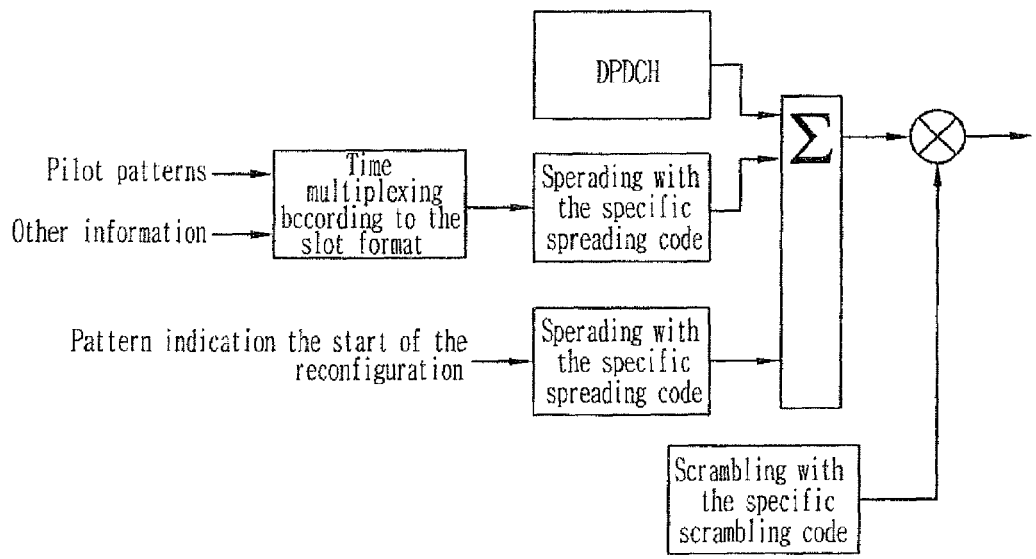
FIG. 21 shows an indication of reconfiguration on the physical layer according to the present invention.

In order to give the NodeB the possibility to be warned before the new configuration is sent it would be possible that the UE sends an indication to the NodeB, which would be sent at or before the reconfiguration. Several realizations of such a scheme would be possible. One method could be that the UE indicates this by sending a certain bit pattern on a special spreading code in parallel to the transmission of the DPCCH/DPDCH as shown in FIG. 21.

There a specific pattern is sent which is mapped on an additional specific spreading code. The UE and the NodeB would be informed that the specific pattern and spreading code are used in order to indicate when the reconfiguration takes place.

Another alternative would be that the UE changes the uplink scrambling code only, without starting to try to receive immediately using the new downlink configuration, such that the NodeB is aware of the imminent change of the downlink configuration.

Figure 22:
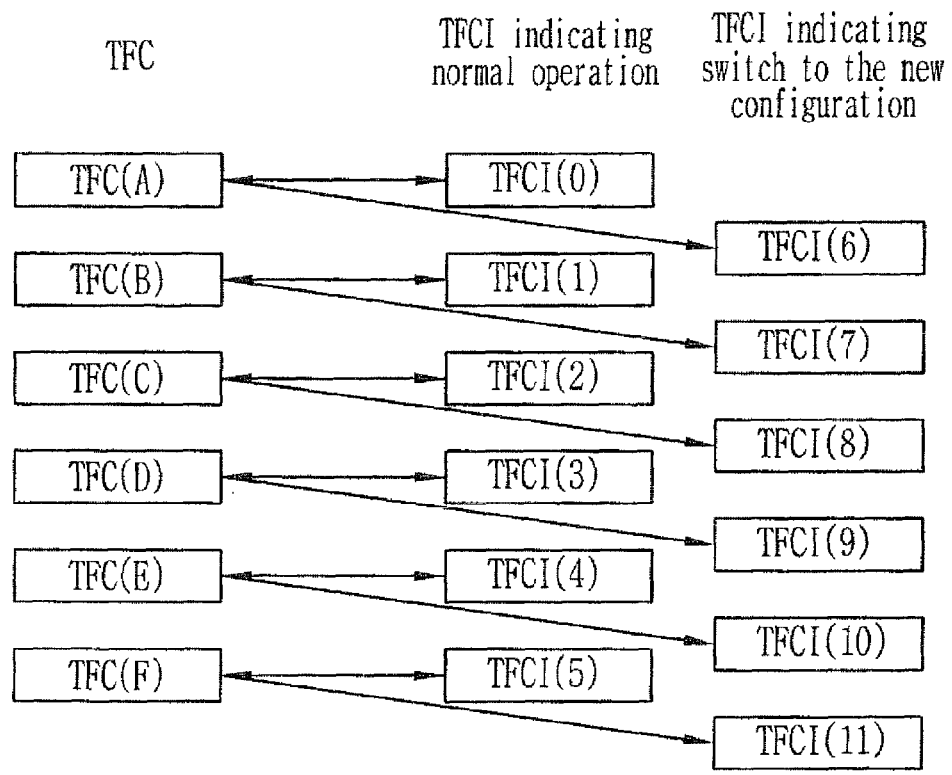
FIG. 22 shows an indication of reconfiguration using double allocation of TFCIs according to the present invention.

Another alternative would be to indicate that the reconfiguration will happen quickly by using alternative TFCIs at or before the reconfiguration, i.e. as shown in FIG. 22, the UE would only use the TFCI 6 before or during the reconfiguration instead of the TFCI 0, TFCI 7 instead of TFCI 1 etc. This implies that the TFCI would not only indicate the transport format combination such as today, but in addition also the switching to the new configuration. How the TFCI includes the information of the switching information would then be configured by the RNC to the NodeB and the UE. Also at which time (e.g. x frames/slots/seconds before the new configuration is applied) the alternative TFCI or other indication is applied would be indicated by the RNC to the NodeB and the UE, which would use this information to synchronize the reconfiguration.

Figure 11:
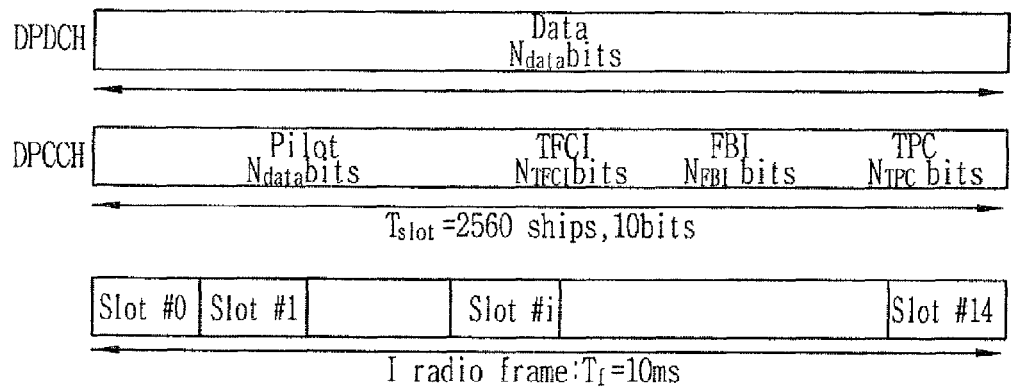
FIG. 11 shows a DPDCH/DPCCH frame structure in the uplink.
Figure 12:
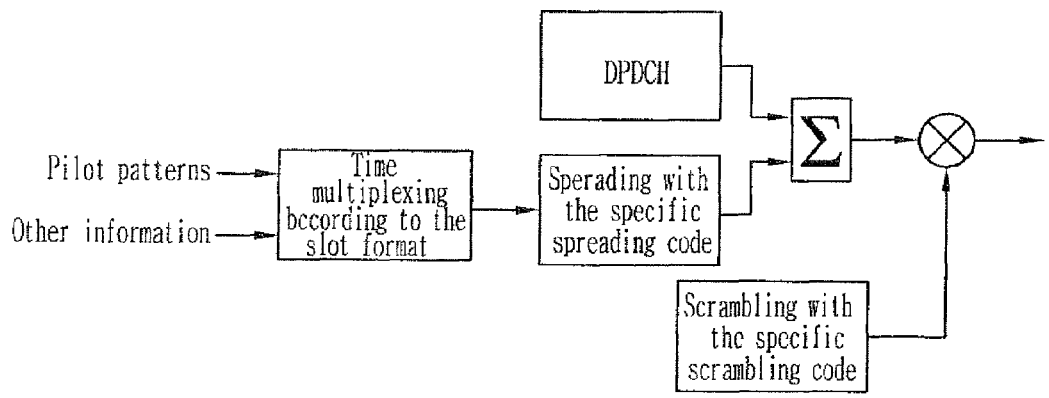
FIG. 12 shows the generation of a signal in the uplink.
Figure 13:
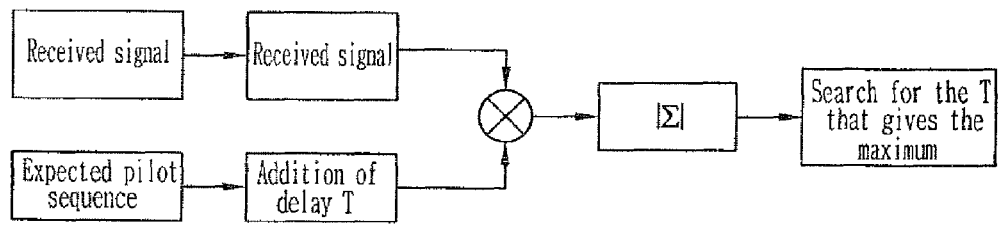
FIG. 13 shows the detection of synchronization.
Figure 14:
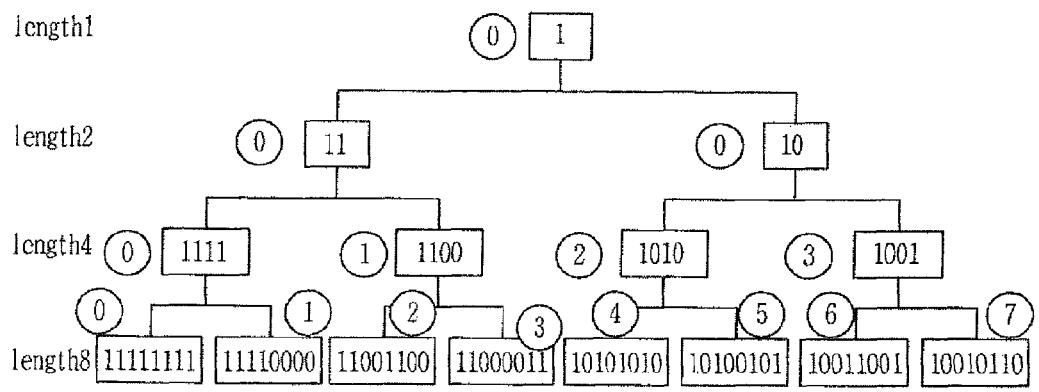
FIG. 14 shows a code management tree with branches of orthogonal spreading codes.
Figure 15:
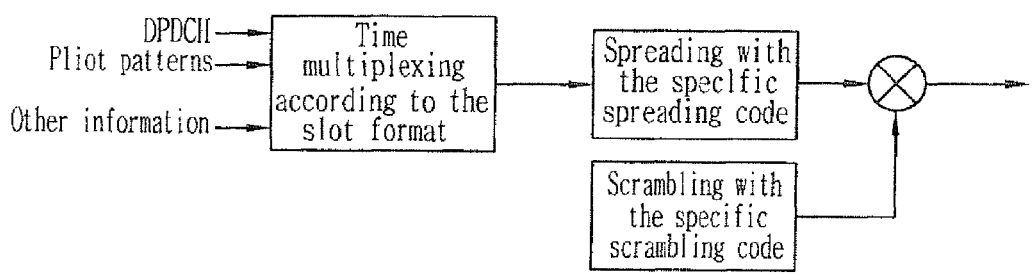
FIG. 15 shows the generation of a signal in the downlink.
Figure 16:
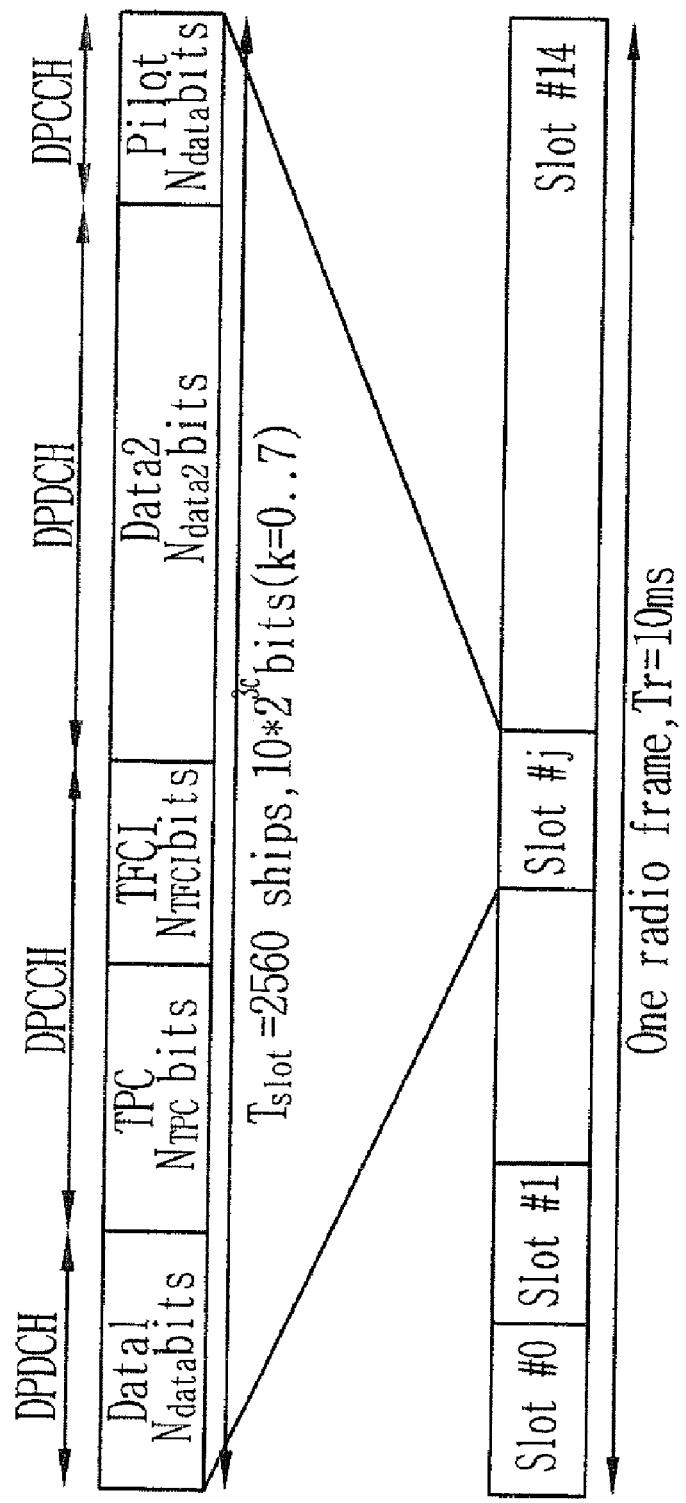
FIG. 16 shows a DPCCH frame structure.
Figure 17:
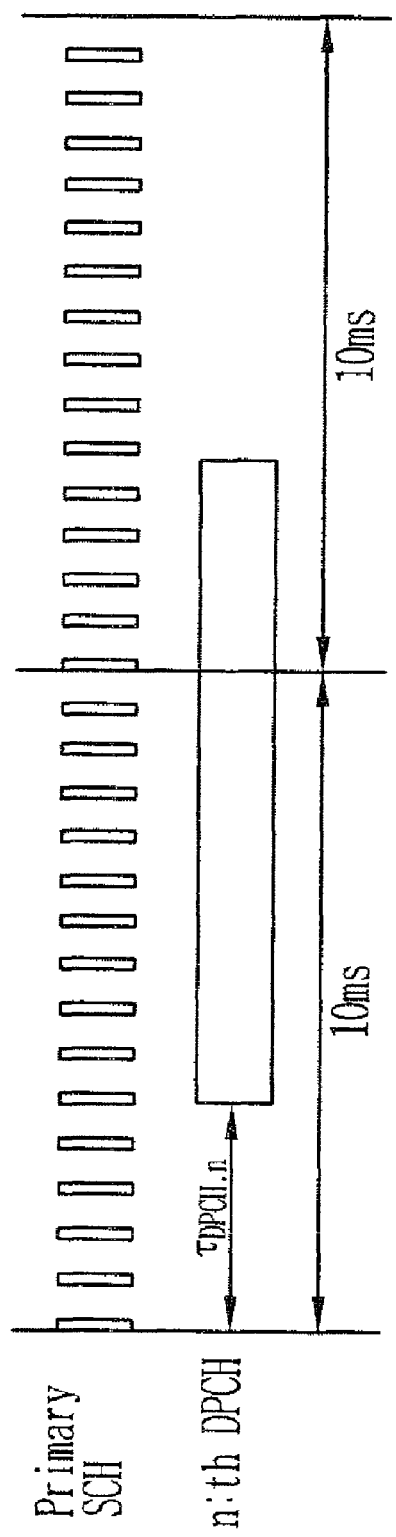
FIG. 17 shows the DPCH timing, whereby the timing of the DPDCH and DPCCH are offset compared to the Primary SCH.

Another alternative would be to allocate the FBI bits as indicated in FIG. 11 in order to indicate the change of the reconfiguration by the UE.

Figure 23:
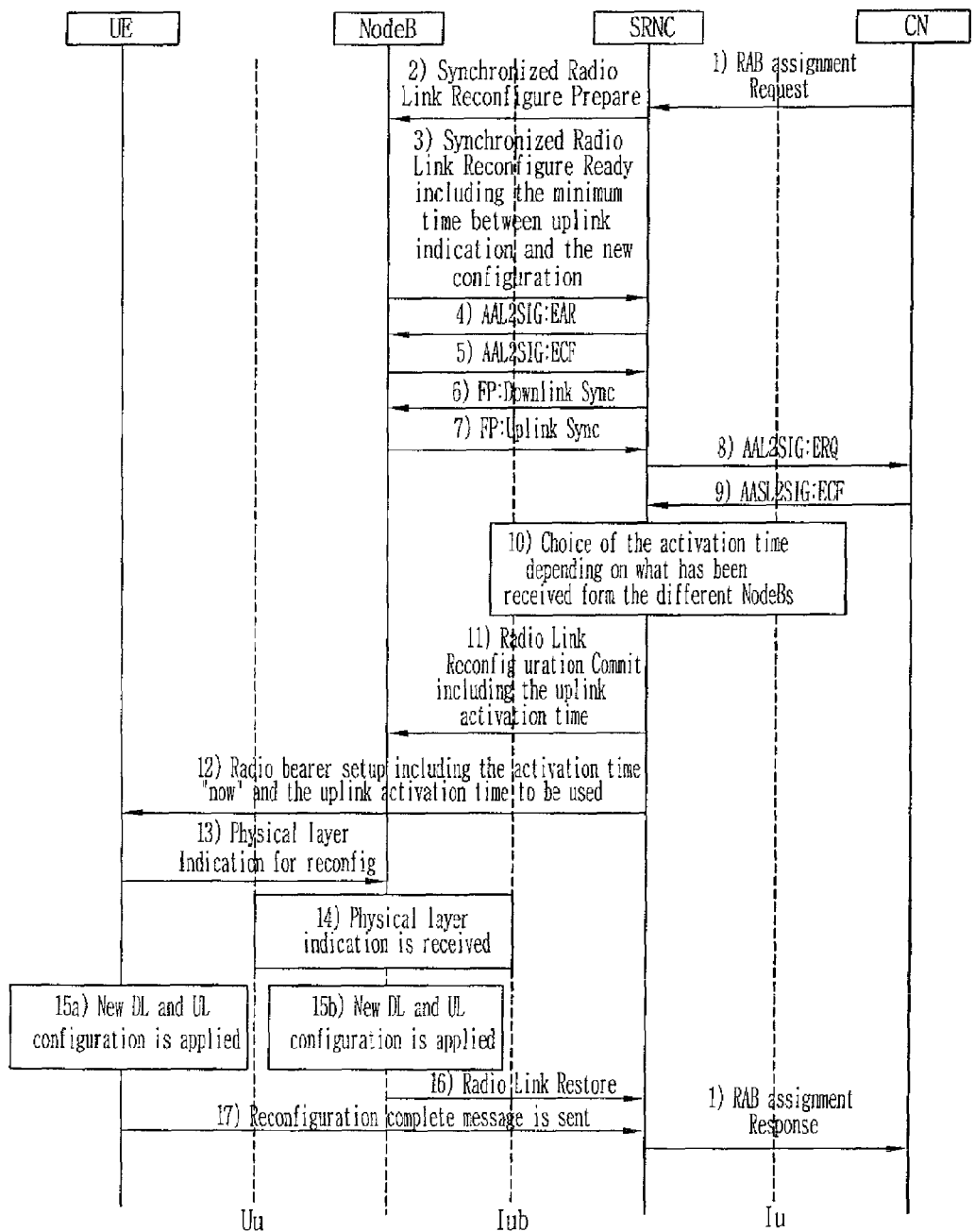
FIG. 23 shows a scheme for simultaneous transmission with UL activation time according to the present invention.

In the different methods as shown above the timing of the uplink indication would be such that the NodeB has sufficiently time to prepare itself to switch to the new configuration. This scheme is shown in FIG. 23.

Because different NodeBs could have different processing times it could be possible that the NodeB indicates the time difference between the transmission of the indication from the UE to the switching to the new configuration to the RNC in step 10, the RNC confirms the time that will be used by the NodeB based on the times received from all NodeBs in the active set of the UE to the NodeB in step 11, and indicates the uplink activation time that the UE should use in step 12. The UE will start then the reconfiguration by transmitting the indication to the NodeB in step 13. The NodeB would upon reception start a timer to synchronize the start of the new configuration with the UE. In step 15a and 15b the UE and the NodeB would start the reconfiguration at the same time. The NodeB and the UE would then confirm the successful reconfiguration in step 16 and 17.

As described above, the present invention provides a method to trigger the use of a new configuration. Such triggers may be comprised of (1) the transmission of the new configuration from the RNC to a UE and a NodeB (2); the configuration of a specific indication in the UE and NodeB to trigger the use of the new configuration; and (3) the indication of the UE to the NodeB that the new configuration is applied where the indication can be any of: FBI bits, uplink scrambling code (to allow backward compatibility), a special bit pattern, a set of TFCIs, or the like. Here, the indication can be sent x seconds before the new configuration is applied where: X is indicated by the RNC to the NodeB and the UE and X might be indicated from the NodeB to the RNC previously depending on the capabilities of the NodeB. The UE may continue the uplink transmission after the application of the new configuration during Y seconds even if the new configuration is not received in the downlink where: Y is indicated by the RNC to the UE and Y might be indicated from the NodeB to the RNC previously depending on the capabilities of the NodeB. A NodeB may transmit two control parts that may be spread using non-orthogonal spreading codes that are scrambled with the same scrambling codes, and where the transmission is time multiplexed. An RNC may choose the timing offsets of two configurations such that the control part of the two configurations can be sent time multiplexed without overlapping, and spread by the non-orthogonal spreading codes of the two configurations.

Accordingly, the present invention speeds up RB setup/release or reconfiguration procedures, and reduces therefore the call setup delay and optimizes the usage of channel resources. The impacts of the invention are relatively small and easily feasible in the software of the RNC/NodeB/UE.

To implement the various features described above, the present invention can employ various types of hardware and/or software components (modules). For example, different hardware modules may contain various circuits and components necessary to perform the steps of the above method. Also, different software modules (executed by processors and/or other hardware) may contain various codes and protocols necessary to perform the steps of the present invention method.

Figure 24:
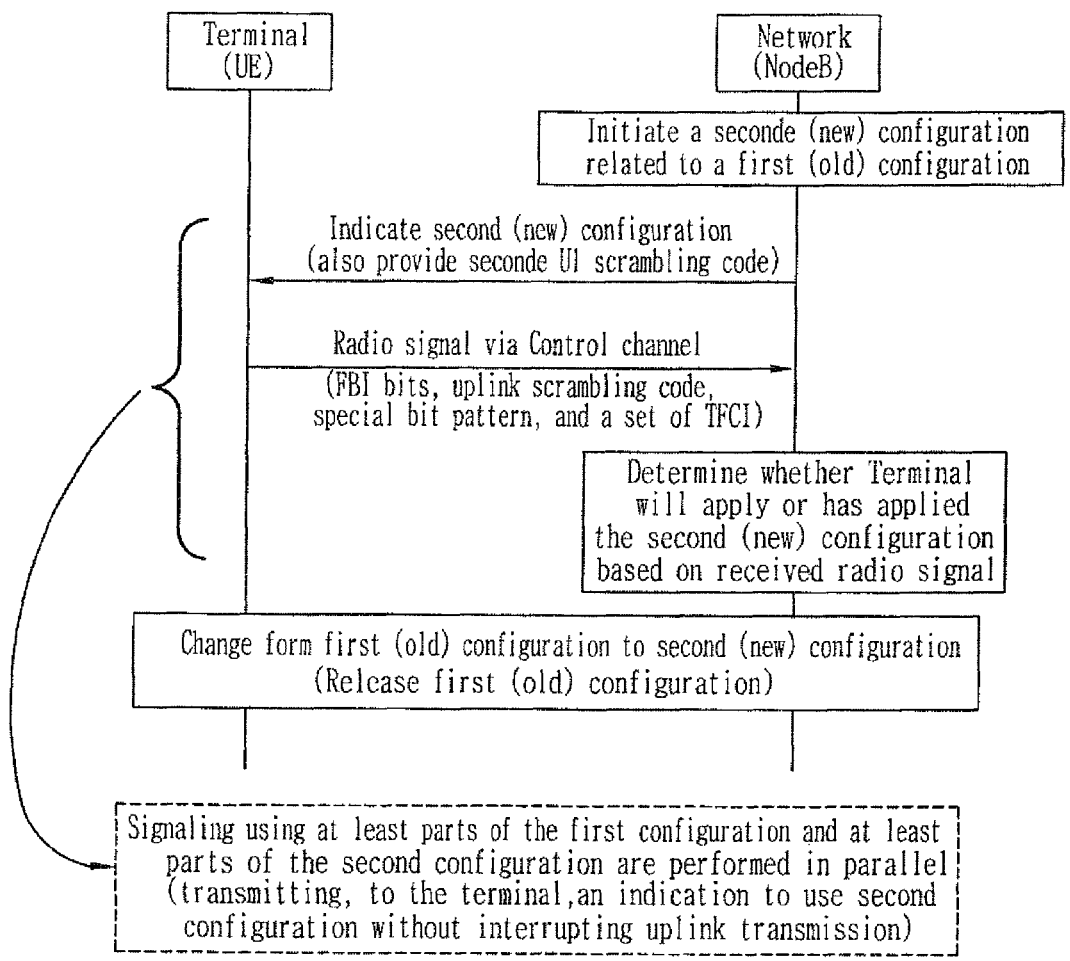
FIG. 24 shows an exemplary method of changing a radio access configuration between a terminal and a network according to the present invention.

FIG. 24 shows an exemplary method of changing a radio access configuration between a terminal (UE) and a network (Node B) according to the present invention.

Namely, the present invention provides a method of changing a radio access configuration between a terminal and a network, the method (e.g., performed by the Node B) comprising: initiating, by the network, a second configuration that is related to a first configuration for the same terminal; informing the terminal to apply the second configuration; and determining when the terminal uses the second configuration based on the reception of a radio signal from the terminal.

The determining may comprise: detecting that the terminal will apply or has applied the second configuration. The determining may comprise: comparing a power of a first radio resource and a power of a second radio resource. The radio signal from the terminal may correspond to a control channel. The control channel may comprise pilot bits modulated by a scrambling code that is different from a scrambling code used for the first configuration. The radio signal is considered to be received when a power of a second uplink scrambling code is higher than a power of a first uplink scrambling code. The second uplink scrambling code may be given by the network together with the second configuration. The control channel may comprise at least one of FBI bits, uplink scrambling code, special bit pattern, and a set of TFCI. The initiating step may comprise: receiving information about the second configuration from a radio network controller; and reserving necessary transport resources for the second configuration. The method may further comprise: releasing the old configuration after the determining step. The method may further comprise: transmitting, to the terminal, an indication to use the second configuration without interrupting uplink transmission. The signaling using at least parts of the first configuration and at least parts of the second configuration may be performed in parallel. The method may further comprise: prior to the initiating step, determining whether a Node B of the network is able to support the first and second configurations.

Also, the present invention provides a method of changing a radio access configuration between a terminal and a network, the method (e.g., performed by the UE) comprising: receiving information to apply a second configuration; transmitting, to the network, a radio signal indicating a change in configuration; and changing from a first configuration to the second configuration at a predetermined time after transmitting the radio signal.

The radio signal indicating the change in configuration may be comprised in the second configuration given by the network. The method may further comprise: continuously transmitting after applying the second configuration for a certain duration despite no reception using the second configuration. The method may further comprise: receiving, from the network, an indication to use the second configuration without interrupting uplink transmission.

Figure 25:
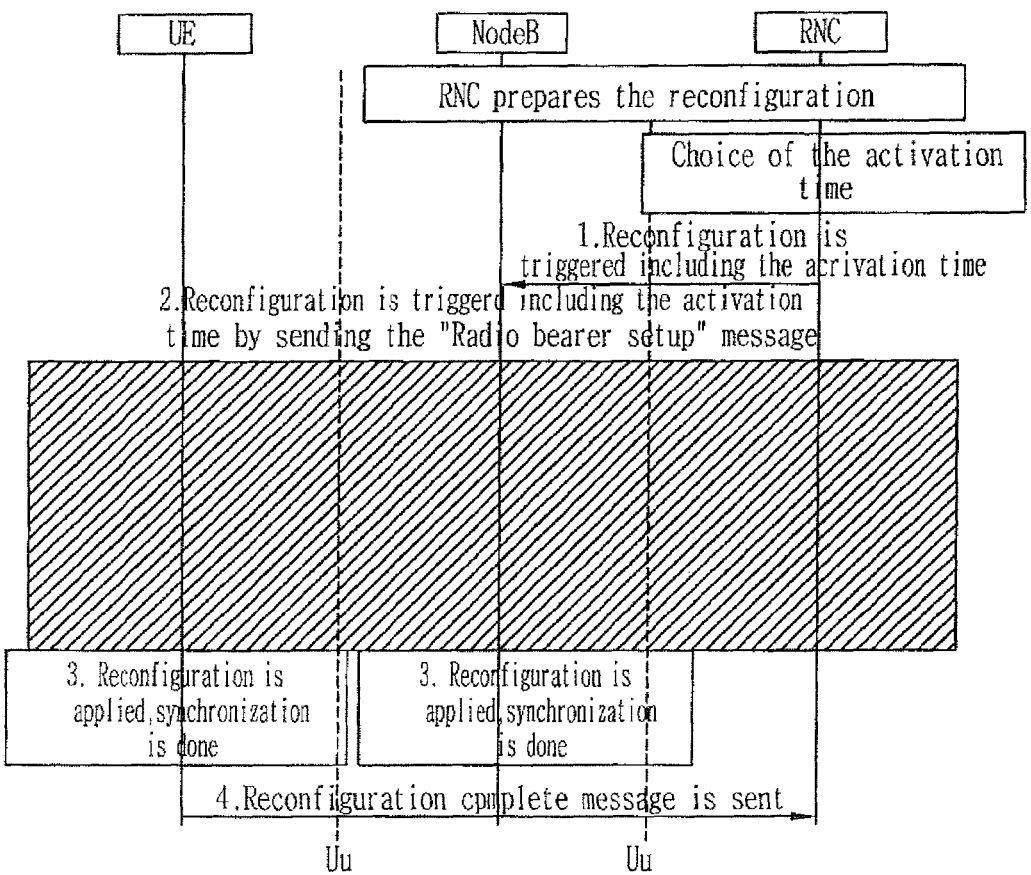
FIG. 25 shows a procedure of synchronized reconfiguration using activation time set.

FIG. 25 shows a procedure of synchronized reconfiguration using activation time set as depicted by steps 1) through 4). In currently used networks, the delay introduced due to the radio bearer setup is a significant part of the delay for the setup or reconfiguration of calls. This delay is mostly imputed to the current procedure of synchronization with activation time, since the UE and NodeB will only apply a new configuration once the activation time has expired. The shaded part indicates the delay where basically the UE and the NodeB are just waiting for the expiry of the activation time. This delay is necessary either in the case when the UE is in a bad radio condition requiring retransmission of the reconfiguration message, or in case of UE failure message requiring some minimum delay. However, in a case where everything works well (no retransmission, no failure message) the same delay is applied which is wasted. Therefore, enhancements for decreasing this delay are necessary and the synchronization by using a new uplink scrambling code is one proposed way.

Figure 26:
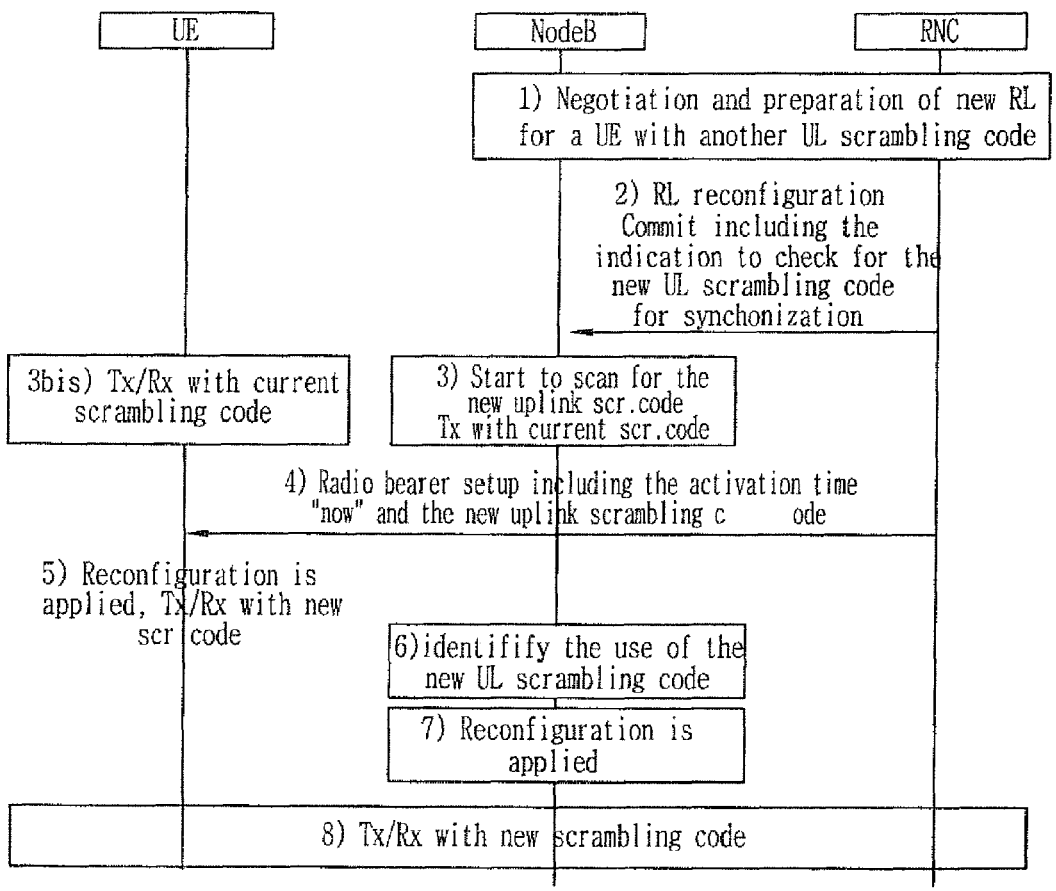
FIG. 26 shows a procedure of synchronized reconfiguration upon the detection of the uplink scrambling code, according to the present invention.

FIG. 26 shows a procedure of synchronized reconfiguration upon the detection of the uplink scrambling code, according to the present invention, as depicted in steps 1) through 8).

In a first step, the resources for the reconfigured radio link are allocated including the change in the uplink scrambling code. It can be noted that beforehand, checking was done on availability of resources, also as UE radio conditions (e.g. current SIR value). Depending of these conditions, RNC and NodeB can decide to apply either current specified synchronization method by waiting of expiry of activation time or synchronization by proposed method.

When RL reconfiguration commit including the indication to check for new UL scrambling code for synchronization, the NodeB would then start to check whether the UE uses the new scrambling code. The RNC transmits the new configuration to the UE with activation time NOW. When received, the UE would then immediately apply the new configuration. Upon detection of the new uplink scrambling code, the NodeB would then stop to transmit the old configuration, apply the new configuration and consider that the reconfiguration is successful.

Figure 27:
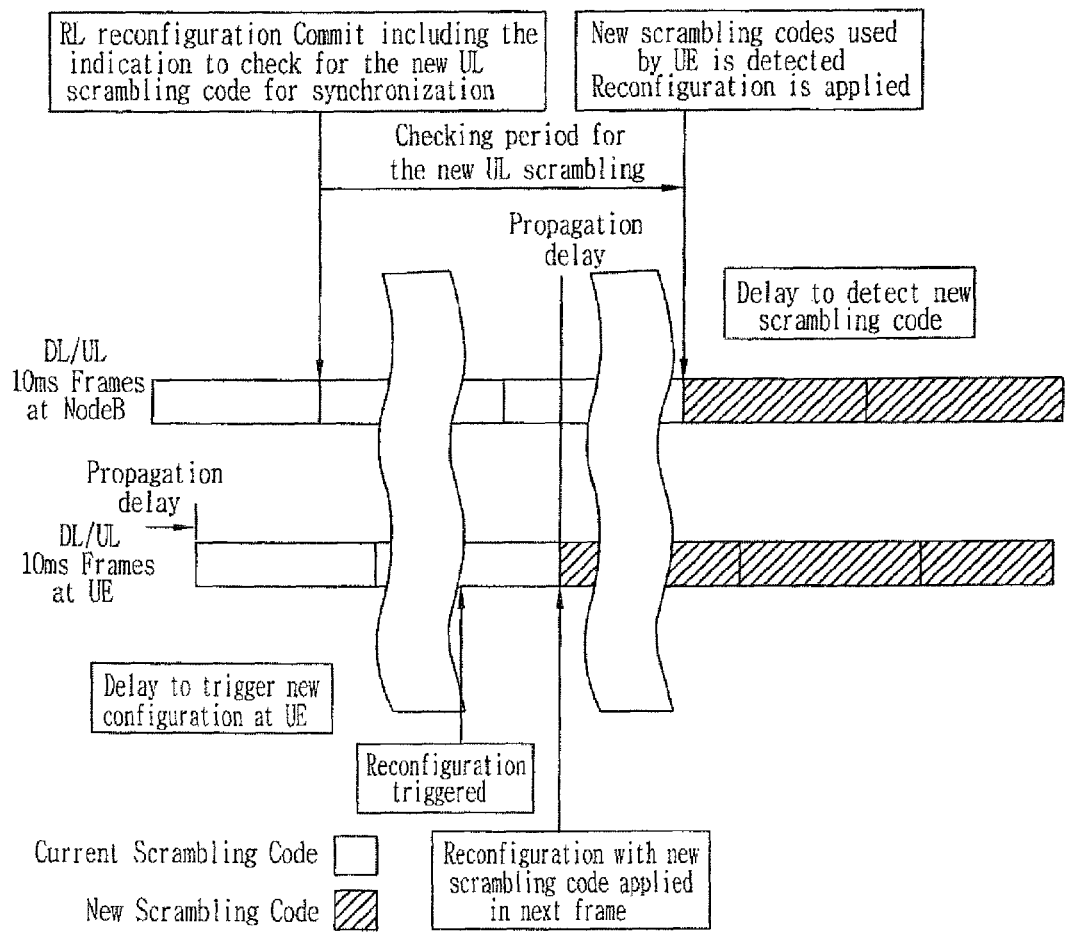
FIG. 27 shows the processing at physical layer.

FIG. 27 shows the processing at physical layer. The physical layer processing is started after setting up L1 in NodeB including the start of checking for new UL scrambling code for synchronization.

When the NodeB receives the reconfiguration message, it continues transmitting and receiving the old configuration and checks constantly whether the UE uses the new or the old scrambling code. As the NodeB is aware of the fact that the UE currently transmitting on a RL will be reconfigured, it knows exactly the channel and the paths of the UL transmission channel. Thus, it can perform detection whether UE uses new configuration or the old configuration, for instance by descrambling with the old and the new scrambling code then checks to see which one receives most of the power.

The delay to trigger the new configuration at the UE can be assumed very short since the UE is supposed to be in relatively good radio conditions requiring none or few message retransmission. The new configuration would include on top of a new uplink scrambling code to be used, the order to the UE do not use the synchronization procedure A (e.g. by not including the IE Frequency Info). When the UE receives the reconfiguration message it will apply the new configuration in the beginning of the next frame. As soon as the UE uses the new configuration it assumes that the DL also uses the new configuration with new scrambling code.

However, the NodeB still continues with the old configuration until having detected the new scrambling code. Thus there may be a risk that UE would detect the loss of synchronization which could lead to a radio link failure in a case where the NodeB takes too long time to detect the new scrambling code. Then the time limit for NodeB to detect the change in scrambling code is given by radio link failure period which is about 3 sec as explained below.

The UE continues the transmission until a radio link failure would be detected. The radio link failure is based on the out-of-sync handling, where the physical layers only report out-of-sync after 160 msec of bad reception. So the first out-of-sync will be sent to upper layers after 160 msec. Further out-of-sync can be transmitted to upper layers every 10 msec. There must be N313 out of sync reported to higher layer to start T313. At expiry of T313 the UE will consider this as a radio link failure and the UE will quit transmission, i.e. after 160 msec+N313*10 msec+T313. The default values for N313 and T313 may be 20 and 3 sec respectively, which would give a delay of 3360 msecs before stopping the uplink transmission.

Therefore as the Node B knows that the new scrambling code and the previous scrambling code are transmitted from the same UE the accurate timing information is available in the NodeB. Then the probability to detect the new scrambling code before the 3 sec of RL failure is higher.

The delay for detection would depend of many parameters as the SIR target that is necessary for the NodeB is implementation specific, also the offset between DPCCH and DPDCH, and the beta values are implementation specific, and outer loop probably impacts the transmission from the UE which is not standardized neither.

In order to detect the change in the scrambling code the threshold needs to be fixed. It is related to different radio conditions (pedestrian, vehicular etc.) and different ULSIRDPCCH targets for the uplink. The target threshold can be defined as the ratio SIRnew/SIRold. Where SIRnew is the measured SIRDPCCH with a new scrambling code, and SIRold is the measured SIRDPCCH with the current (initial) scrambling code. During checking period, as shown in FIG. 27, the target threshold is compared to the current measured SIRnew/SIRold; when it exceed the target threshold NodeB considers the change in uplink scrambling code then apply new configuration parameters.

In order to define the target threshold, simulation is performed to define for each ULSIRDPCCH targets two CDFs of the maximum ratio of SIRnew/SIRold one corresponding to the ratio before the UE has applied the new configuration and another one to the ratio after the UE has applied the new configuration. Based on these CDFs the threshold can be defined for different UL SIR DPCCH values that the NodeB should use such that the false detection probability is limited to a certain value. Then CDFs of SIRnew/SIRold for each slots (or N averaged slots) after the UE has applied a new configuration will allow to check after how many slots the NodeB would have detected the new scrambling code with a given probability.

One characteristic of the present invention is to combine the advantages of the synchronized reconfiguration procedure in terms of efficiency and resource usage with the speed of the unsynchronized hard handover procedure in order to decrease the delay for a reconfiguration procedure that is typically used e.g. for the video/voice call setup or the reconfiguration of radio links.

Figure 28:
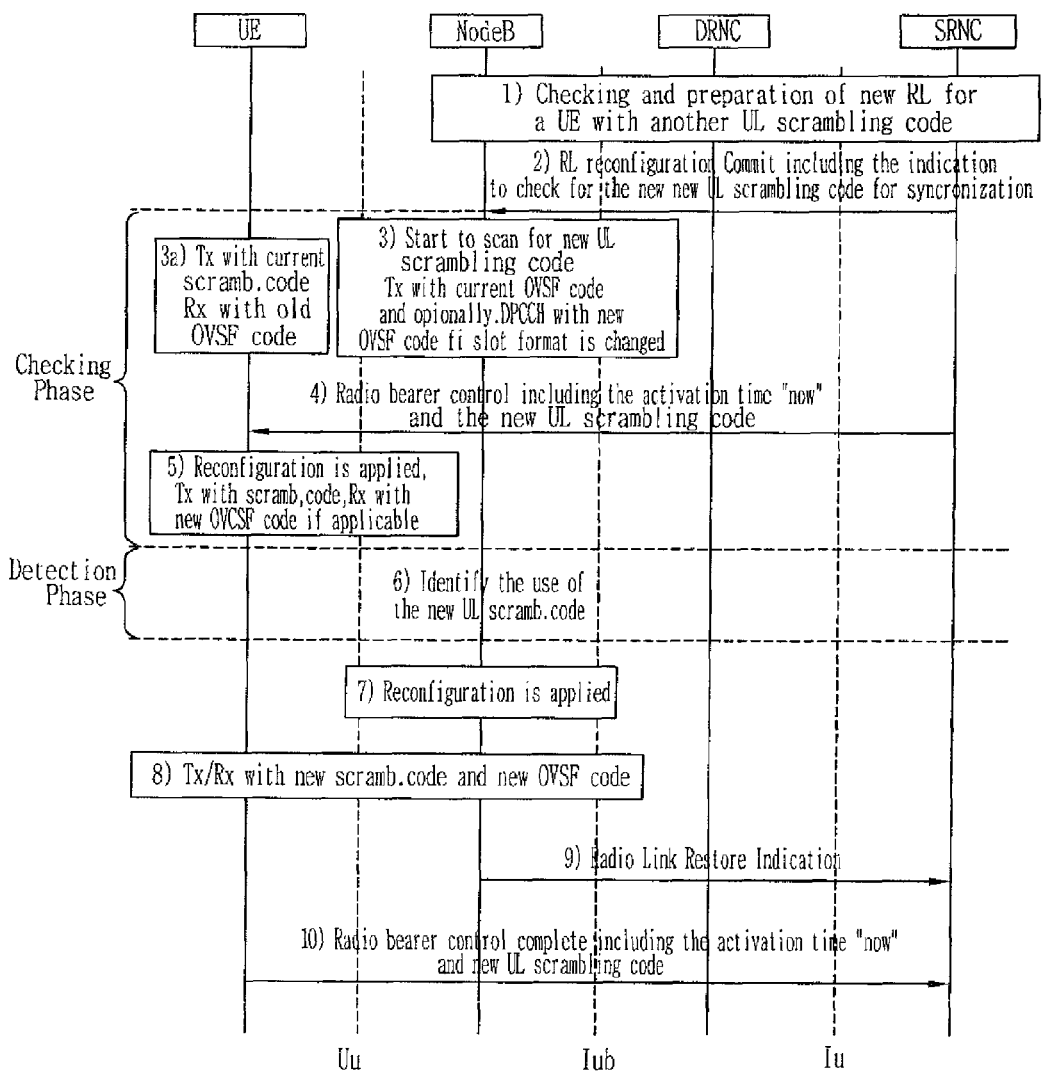
FIG. 28 shows an exemplary scheme for using Synchronization by Activation Time NOW and new scrambling code according to the present invention.

FIG. 28 shows an exemplary scheme for using Synchronization by Activation Time NOW and new scrambling code according to the present invention, as depicted in steps 1) through 10).

In step 1, the resources for the reconfiguration of this radio link are allocated including the change in the uplink scrambling code. It can be noted that the allocation of resources can include the availability of resources, whether the NodeB or the DRNC support the procedures as well as a check of the radio conditions (e.g. current SIR value). Depending on these conditions, the network (e.g., RNC and NodeB) can decide to apply either the current specified synchronization method by waiting of expiry of the activation time or apply a new synchronization method.

When RL reconfiguration is triggered as shown in step 2 using the Radio Link Reconfiguration Commit message including the indication to check for the new UL scrambling code for synchronization (i.e., Fast Reconfiguration IE) in the case that it has been confirmed previously in step 1 that this procedure can be applied, the NodeB would then start to check whether the UE uses the new scrambling code. It may be up to the NodeB implementation to ensure that the reconfiguration is reliable. This can be done by the NodeB by transmitting at least the downlink DPCCH of the new configuration such that the UL power control is maintained. The power of the transmission of the downlink DPCCH using the new configuration can be linked to the power for the transmission of the old DPCCH. Until the NodeB has detected that the UE uses the new configuration in the uplink the NodeB should send UP commands. The CFN value that is still contained in the Radio Link Reconfiguration Commit is used in order to indicate the earliest possible CFN at which the reconfiguration might be applied by the UE. Therefore the reliability of this procedure should be at least similar to the reliability of the hard handover procedure or higher, because during the procedure the timing of the RLs are not changed.

If necessary, the RNC can increase the SIR target for the outer loop power control during the reconfiguration phase via the OUTER LOOP PC control frame.

The RNC transmits the new configuration to the UE with activation time NOW as shown in step 4 in a RB control message. When received the UE then immediately applies the new configuration as shown in step 5. Upon detection of the new uplink scrambling code the NodeB then stops to transmit the old configuration, applies the new configuration and considers that the reconfiguration is successful.

In order to indicate to the RNC that the new configuration is applied in the uplink and the downlink the Radio Link Restore Indication is sent to the RNC such that the RNC can start to use the new configuration as shown in step 9. In step 10 the UE indicates the completion of the reconfiguration to the RNC.

Figure 29:
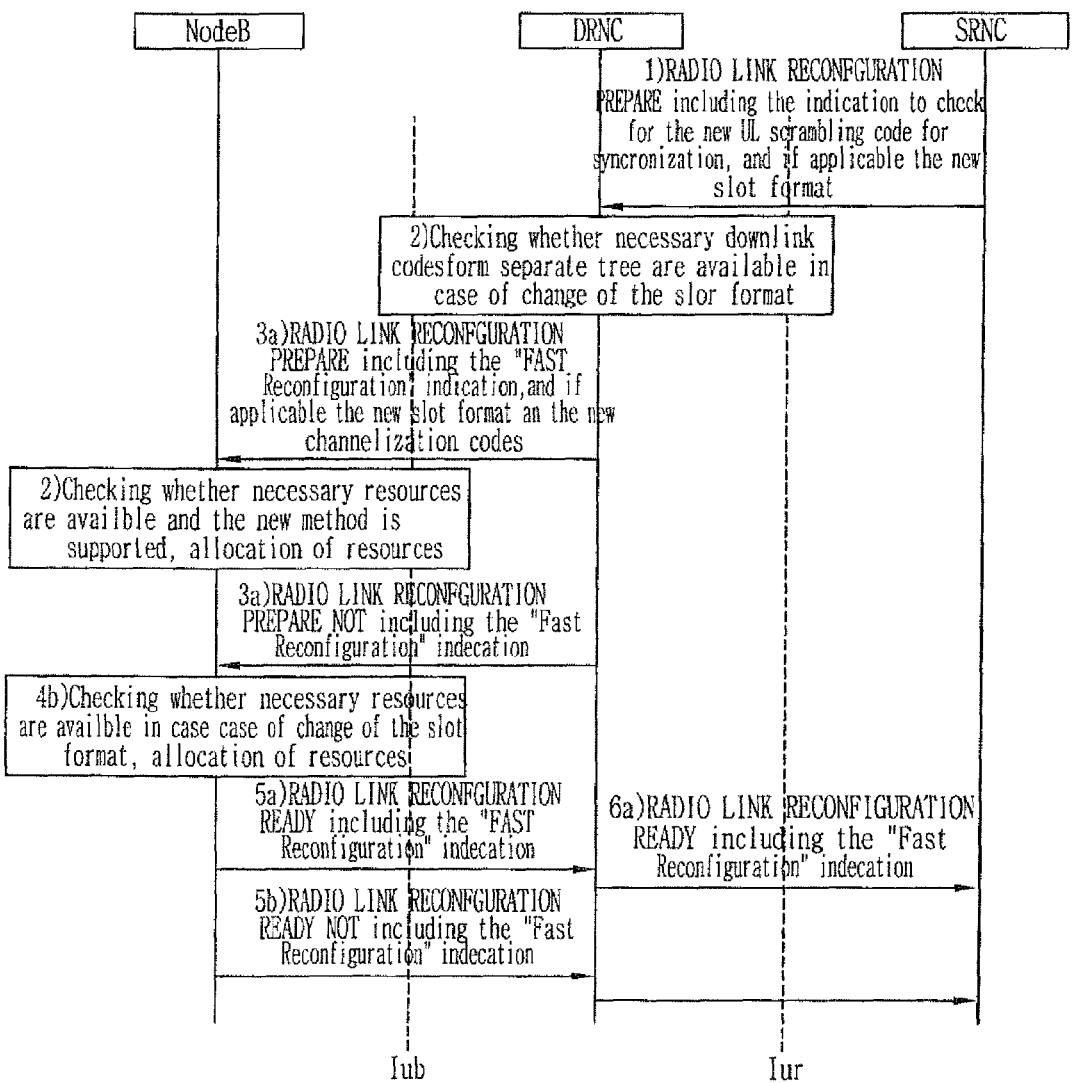
FIG. 29 shows the details of the behaviour for the case where the NodeB is on the Iur interface.

In FIG. 29, the details of the behaviour for the case where the NodeB is on the Iur interface are shown.

In step 1 the SRNC indicates to the DRNC that a reconfiguration is necessary, and by including the Fast Reconfiguration IE, it indicates to the DRNC that the synchronization should be performed via the new method as shown in step 1.

In step 2, the DRNC can then determine whether the necessary resources are available, and if necessary, allocate DL OVSF codes from a different branch of the code tree, i.e. codes that are uncorrelated in order to allow the simultaneous broadcast of the old and the new DL DPCCH channels. If the new IE is not understood the DRNC will ignore this information, and not send the Fast Reconfiguration IE in the RADIO LINK RECONFIGURATION READY message which allows the SRNC to understand that the legacy procedure should be used, and the DRNC performs the legacy procedure as shown in steps 3b, 4b, 5b and 6b.

In the case that the checking and resource reservation in step 2 was successful, the DRNC indicates to the NodeB that the synchronization of the reconfiguration should be based on the UL scrambling code as shown in step 3a, which allows the NodeB in step 4a to reserve the necessary resources and determine whether the new method is supported or not. In the case that the NodeB does not comprehend the Fast Reconfiguration IE the NodeB proceeds with the legacy method as shown in steps 4b, 5b and 6b.

As explained above in the case that the slot format is changed during the reconfiguration it is preferable that the DL spreading codes used prior to the reconfiguration and after the reconfiguration are used from a different branch of the code tree. This is due to the fact that this allows firstly to transmit the DL DPCCH of the old and the new configuration in parallel, and secondly that during the frames during which the NodeB applies the old configuration and the UE supposes that the new configuration is transmitted the UE would interpret, e.g., the pilot bits sent by the NodeB using the old configuration with the old spreading code and the old slot format as the TPC bits in the new configuration. This can happen due to the fact that the OVSF codes from the same branch with different spreading factors are not necessarily orthogonal and the patterns for the DPCCH in different slot formats is not the same.

Regarding the complexity in the NodeB and system impact, the impact of the present invention scheme on the NodeB implementation of course depends largely on the details of the actual NodeB implementation. However, the complexity due to the need to receive and optionally transmit simultaneously on an old and a new configuration is always inferior to the complexity of a hard handover where two completely independent channel estimations and receptions need to be performed. Also it should be highlighted that the duration of reception of the old and the new configuration is smaller than the double reception in the case that the hard handover procedure is used due to the fact that the earliest time is included in the Radio Link Reconfiguration Commit message.

Alternative proposals with UE impact have been proposed. Such would allow the use of reconfiguration with the activation time NOW instead of using the synchronized radio link reconfiguration. It is proposed that the UE e.g. changes the TFCI pattern used, the FBI bits or that the UE uses a different pilot pattern already before it applies the new configuration. This would allow the NodeB to detect that the change of the configuration will happen soon. However, this implies that there is additional delay introduced due to the fact that the UE does not apply the new configuration immediately. Also, the reliability of such a scheme is not necessarily higher, since the reliability depends mainly on the power sent in the UL, and the number of FBI or TFCI bits is in all slot formats smaller than the number of the pilot bits. Therefore, we consider that the additional complexity in the UE, and the availability of such a procedure only in the most recent terminals and networks (e.g., Release 7) may not be as attractive as the present invention, which proposes a method that allows to reduce the delay for reconfigurations to be reduced by several hundreds of milliseconds, without impacting the UE implementation.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method of changing a radio access configuration between a terminal and a radio network controller (RNC), the method comprising:
   initiating, by the RNC, a second configuration that is related to a first configuration for the terminal;
   transmitting, from the RNC to a Node B, a second configuration commit message including an indication for the Node B to check whether the terminal is using a changed uplink scrambling code, wherein the changed uplink scrambling code is a scrambling code that is different than a scrambling code utilized by the first configuration, and wherein the changed uplink scrambling code is to be applied for the second configuration;
   transmitting, from the RNC to the terminal, a second configuration setup message and a time indication message, wherein the time indication message includes application time information and outage time information, wherein the application time information indicates when the terminal should apply the second configuration, and the outage time information indicates a duration of time between transmitting the time indication message and a time when the terminal should apply the second configuration, wherein the duration of time is a time during which the terminal should continue uplink transmission even when downlink transmission stops;
   comparing a power of a radio resource corresponding to the first radio configuration and a power of a radio resource corresponding to the second radio configuration; and
   determining, by the RNC, when the terminal will apply or has applied the second configuration based on reception of a first radio signal indicating a channel status from the terminal and of a message indicating a channel status from the Node B, wherein the determining is performed when the power of the radio resource corresponding to the first radio configuration is greater than the power of the radio resource corresponding to the second radio configuration.

2. The method of claim 1, wherein the first radio signal from the terminal corresponds to a control channel.

3. The method of claim 2, wherein the control channel comprises pilot bits modulated by a scrambling code that is different from the scrambling code used for the first configuration.

4. The method of claim 2, wherein the control channel comprises at least one of FeedBack Information (FBI) bits, an uplink scrambling code, a special bit pattern, or a set of Transport Format Combination Indicators (TFCIs).

5. The method of claim 1, wherein the first radio signal is considered to be received when a power of a second uplink scrambling code is higher than a power of a first uplink scrambling code.

6. The method of claim 5, wherein the second uplink scrambling code is provided by the RNC together with the second configuration.

7. The method of claim 1, wherein initiating the second configuration comprises:
   receiving information about the second configuration from the radio network controller; and
   reserving necessary transport resources for the second configuration.

8. The method of claim 1, further comprising:
   releasing the first configuration after determining that the terminal has applied the second configuration.

9. The method of claim 1, further comprising:
   transmitting, to the terminal, an indication to use the second configuration without interrupting uplink transmission.

10. The method of claim 1, wherein signaling using at least parts of the first configuration and at least parts of the second configuration are performed in parallel.

11. The method of claim 1, further comprising:
    determining whether the Node B is able to support the first and second configurations prior to initiating the second configuration.

12. A method of changing a radio access configuration between a terminal and a radio network controller (RNC), the method comprising:
    receiving, by the terminal from the radio network controller (RNC), an indication to apply a second configuration instead of a currently utilized first configuration, wherein the indication includes application time information and outage time information, wherein the application time information indicates when the terminal should apply the second configuration, and the outage time information indicates a duration of time between transmitting the indication signal and a time when the terminal should apply the second configuration, wherein the duration of time is a time during which the terminal should continue uplink transmission even when downlink transmission stops;
    transmitting, by the terminal to the radio network controller (RNC), a radio signal indicating a change in configuration will occur in the terminal;
    transmitting, by the terminal to a Node B, an indication signal including a changed uplink scrambling code to indicate a particular time of changing to the second configuration; and
    changing, by the terminal, from the first configuration to the second configuration at a pre-determined time after transmitting the radio signal, wherein the changed uplink scrambling code is a scrambling code that is different than a scrambling code utilized by the first configuration, and wherein the changed uplink scrambling code is for the second configuration.

13. The method of claim 12, wherein the radio signal indicating the change in configuration is transmitted in response to the reception of the indication from the radio network controller (RNC) to apply the second configuration.

14. The method of claim 12, further comprising:
continuously transmitting after applying the second configuration for a certain duration despite no reception using the second configuration.

15. The method of claim 12, further comprising:
receiving, from the radio network controller (RNC), an indication to use the second configuration without interrupting uplink transmission.

16. A method of changing a radio access configuration between a terminal and a radio network controller (RNC), the method comprising:
deciding, by a Node B in communication with the RNC, to apply a second configuration to the terminal, wherein the second configuration is related to a currently utilized first configuration of the terminal;
receiving, at the Node B from the RNC, a configuration commit message including an indication for the Node B to check whether the terminal is using a changed uplink scrambling code, wherein the changed uplink scrambling code is a scrambling code that is different than a scrambling code utilized by the first configuration, and wherein the changed uplink scrambling code is for the second configuration;
transmitting, from the RNC to the terminal, a second configuration setup message and a time indication message, wherein the time indication message includes application time information and outage time information, wherein the application time information indicates when the terminal should apply the second configuration, and the outage time information indicates a duration of time between transmitting the time indication message and a time when the terminal should apply the second configuration, wherein the duration of time is a time during which the terminal should continue uplink transmission even when downlink transmission stops;
checking, by the Node B, whether the terminal is using the changed uplink scrambling code, wherein the checking is performed responsive to receiving the indication from the RNC; and
changing configuration of the Node B to communicate with the terminal using the changed uplink scrambling code, the changing of configuration occurring responsive to the checking identifying that the terminal is using the changed uplink scrambling code.

* * * * *